United States Patent
Toyoda et al.

(10) Patent No.: US 6,594,490 B1
(45) Date of Patent: Jul. 15, 2003

(54) MOBILE COMMUNICATION SYSTEM

(75) Inventors: Takamitsu Toyoda, Tokyo (JP); Mitsunori Fukazawa, Kawasaki (JP); Kazumasa Ushiki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/505,510

(22) Filed: Feb. 17, 2000

(30) Foreign Application Priority Data

Feb. 19, 1999 (JP) .............................. 11-042155

(51) Int. Cl.[7] .............................. H04Q 7/20; H04Q 7/23
(52) U.S. Cl. ................ 455/433; 455/432; 455/560; 455/422; 455/445
(58) Field of Search ....................... 455/432, 433, 455/435, 422, 445, 412, 424, 456, 517, 403, 500, 550, 560, 552, 507, 508

(56) References Cited

U.S. PATENT DOCUMENTS

| | | |
|---|---|---|
| 5,490,201 A | 2/1996 | Moberg et al. |
| 5,537,457 A | 7/1996 | Lantto et al. |
| 5,561,854 A | 10/1996 | Antic et al. |
| 5,594,942 A | 1/1997 | Antic et al. |
| 5,819,178 A * | 10/1998 | Cropper .................. 455/433 |
| 6,078,811 A * | 6/2000 | Lin et al. ................ 455/433 |
| 6,097,951 A * | 8/2000 | Ernam et al. ............ 455/433 |
| 6,119,012 A * | 9/2000 | Amirijoo ................ 455/432 |
| 6,381,456 B1 * | 4/2002 | Ko ......................... 455/433 |

FOREIGN PATENT DOCUMENTS

| | | |
|---|---|---|
| JP | 5-22218 | 1/1993 |
| JP | 6-133357 | 5/1994 |
| JP | 10056608 | 2/1998 |
| WO | WO 96/29838 | 9/1996 |

OTHER PUBLICATIONS

Yi–Bing, Lin, "Reducing Location Update Cost in a PCS Network", IEEE/ACM Transactions On Networking, US, IEEE Inc., New York, vol 5, No. 1, Feb. 1, 1997, pp. 25–33.
Joseph Ho et al., "Local Anchor Scheme For Reducing Signaling Costs in Personal Communications Networks", IEEE/ACM Transactions On Networking, US, IEEE, New York, vol. 4, No. 5, Oct. 1, 1996, pp. 709–725.

* cited by examiner

Primary Examiner—William Trost
Assistant Examiner—Keith Ferguson
(74) Attorney, Agent, or Firm—Katten Muchin Zavis Rosenman

(57) ABSTRACT

The present invention relates to a mobile communication system. Particularly, the present invention provides a mobile communication system that has functions of autonomously relieving and recovering from a station-location-information loss phenomenon which may be caused when the system performs switching between active and standby home location registers in response to an occurrence of a fault. This mobile communication system has home location registers, visitor location registers, mobile switching centers, and mobile stations. In this mobile communication system, each of the home location register comprises a rerouting information acquisition section for performing routing information acquisition processing when receiving in response to a routing information acquisition message, which is sent out to one of the visitor location registers a response message indicating that a corresponding one of the mobile stations is not present.

20 Claims, 27 Drawing Sheets

| VLR1 | VLR2 | VLR3 | VLR4 | -------- | VLR10 | VLR11 | VLR12 |

Fig.10

| VLR1 | VLR2 | VLR3 | VLR4 | VLR5 | VLR6 | VLR7 |
|---|---|---|---|---|---|---|

| VLR2 | VLR1 | VLR3 | VLR7 | VLR8 | VLR9 | VLR10 |
|---|---|---|---|---|---|---|

Fig.11

| VLR1 | VLR2 | VLR3 | VLR4 | VLR5 | VLR6 | VLR7 |
|---|---|---|---|---|---|---|
|  | 200 | 300 | 400 | 500 | 600 | 700 |

MOBILE COMMUNICATION SYSTEM

BACKGROUND OF THE INVENTION

1. Field of the Invention

The present invention generally relates to a mobile communication system and, more particularly, to a mobile communication system that has an active home location register (HLR) and a standby home location register which includes a database having the same contents as those of a database of the active home location register, and that has the functions of autonomously recovering from a mobile-station-location-information loss phenomenon which may be caused when the system performs switching between the active and standby home location registers in response to an occurrence of a fault.

2. Description of the Related Art

A conventional mobile communication system comprises an active home location register, a standby home location register which includes a database having the same contents as those of the active home location register, visitor location registers (VLR), mobile switching centers (MSCs), and mobile stations (MSs). When a fault occurs in the active home location register of this system, the active home location register is switched to the standby home location register which now serves as a new active home location register. Thus, the system continues operation.

The contents of the database of the standby home location register are periodically updated in such a manner as to match the contents of the database of the active home location register. Therefore, generally, even after the active home location register is switched to the standby home location register as described above, the contents of the database of the new active home location register match those of the database of an old active home location register. Consequently, it is expected that the system will continue normal operation.

As described above, the conventional system periodically updates the contents of the database of the standby home location register. However, when a fault occurs in the active home location register, the active home location register is immediately switched to the standby home location register. This results in a difference in contents between the database of the old active home location register used before an occurrence of a fault and that of the new active home location register (namely, the old standby home location register) used after the occurrence of the fault. FIGS. 1 to 3 illustrate an example of such a conventional system.

FIG. 1 shows the constitution of an example of an ordinary mobile communication network.

As shown in this figure, an active home location register (ACT-HLR) 1 and a standby home location register (STABY-HLR) 2 are connected to a network 3 including a portable telephone network and an automobile telephone network. Further, each of areas (AREAa and AREAb) 4 and 5 under the control of the network 3 is provided with a corresponding one of visitor location registers (VLRs) 7 and 9 for registering station location information on the location of a mobile station therein and a corresponding one of mobile switching centers (MSC) 6 and 8 for performing switching between the mobile stations.

In the case of this example, a mobile station (MS-X) 10, such as a portable telephone or an automobile telephone, is present in the area 4. The location of this mobile station is registered. Therefore, the mobile switching center 6 and the visitor location register 7 provided in the area 4 hold the profile (indicated as MS-X) of the mobile station 10. Further, the mobile station and the station location information thereof are respectively registered (as indicated by the expression "MS-X: AREAa") in the active home location register 1 and the standby home location register 2 through the network 3.

FIG. 2 illustrates an example of the case that a fault occurs in the active home location register of FIG. 1.

That is, this figure illustrates the case in which the mobile station 10 moves from the area 4 to the area 5 and then makes a request for registration of the location thereof in the area 5, and in which the registration of the location thereof is subsequently completed. Thus, the profile of the mobile station 10 is deleted from the mobile switching center 6 and the visitor location register 7 in the area 4. Moreover, the profile of the mobile station 10 is copied from the active home location register 1 to the mobile switching center 8 and the visitor location register 9 in the area 5.

Although the latest registered location information (AREAb) of the mobile station 10 is registered in the active home location register 1, the database of the standby home location register 2 of this example is not updated yet. Therefore, the registered location information (hereunder sometimes referred to as location registration information) of the mobile station 10 is still registered in the old registration area (AREAa).

FIG. 3 illustrates an example of the aforementioned conventional location registration sequence.

Incidentally, it is supposed herein (and in the following descriptions of examples) that IS-41-C (Interim Standard 41 Revision C) standardized in north America is employed as a signal protocol for a mobile communication system, in which signals are transferred through a signal network. The aforementioned protocol is generically called MAP (Mobile Application Protocol/Part).

As shown in FIG. 3, the mobile station 10 moves from the area 4 to the area 5 and then transmits a location registration request message to the mobile switching center 8 in the area 5 in which the station 10 is present (step S101). Subsequently, the mobile switching center 8 transmits a location registration request message (REGNOT) concerning the mobile station 10 to the visitor location register 9 (step S102), which then transmits the location registration request message to the active home location register 1 (step S103).

After receiving this message, the active home location register 1 transmits a location registration canceling message (REGCANC)to the visitor location register 7 (step S104) in a current registration area (AREAa). Then, the visitor location register 7 transmits a location registration canceling request message to the mobile switching center 6 (step S105). If the mobile switching center 6 has the profile of the mobile station 10, the center 6 deletes this profile and returns a location-registration-canceling-request response message (regcanc) to the visitor location register 7 (step S106).

When the active home location register 1 receives the location-registration-canceling-request response message from the visitor location register 7, the register 1 updates the registration area (AREAa), in which the profile of the registered mobile station 10 is registered, to the latest registration area (AREAb) and then transmits a location-registration-request response message (regnot) to the visitor location register 9 provided in the area 5 (steps S108 to S110). Subsequently, the visitor location register 9 provided in the area 5 registers the profile of the mobile station 10, which is contained in the location-registration-request response message, therein and transmits a location-registration-request response message to the mobile switching center 8 (steps S110 to S112). Similarly, the mobile switching center 8 registers the profile of the mobile station 10 therein.

Incidentally, there are the following two manners of transmission of the profile from the home location register to the visitor location register and the mobile switching center: a) transmission of the profile as a parameter of a profile transferring message; and b) transmission of the profile as a parameter of a location-registration-request response message. Although only the manner b) has been described in the foregoing description of the aforementioned example, the manner a) may be employed instead of the manner b).

Meanwhile, FIG. 2 illustrates the case that a fault occurs in the active home location register 1, as indicated by "X", after the aforementioned process. Consequently, the active home location register 1 is immediately switched to the standby home location register 2, which then starts operation as a new active home location register 2 according to old registration information corresponding to the area (AREAa), in which the mobile station 10 is not present. At this time, a state in which the new active location register 2 lacks the location registration information concerning the mobile station 10 occurs in the system.

FIG. 4 illustrates an example of a conventional incoming call sequence.

Particularly, this figure shows the case that an incoming call arrives the mobile station 10, the location registration information of which lacks the state shown in FIG. 2. As shown in this figure, when receiving, from a gateway mobile switching center (G-MSC), a location registration inquiry message (LOCREQ) making an inquiry concerning the location information on the location of the mobile station 10 (step S201), the new active home location register 2 refers to the registered location information(AREAa) concerning the mobile station 10 and then sends out a routing information acquisition message (ROUTREQ) to the visitor location register 7 provided in the area 4 (step S202).

When receiving the routing information acquisition message, the visitor location register 7 returns a response message containing an error code ("ERROR CODE= Unrecognized MIN") to the active home location register 2 (step S204), because the visitor location register 7 does not have the profile of the mobile station 10 (step S203), which is a called station. When receiving the response message containing the error code, the active home location register 2 deletes the registered location information (AREAa) concerning the mobile station 10 (step S205) and then returns a response message (locreq) containing an error code (ERROR CODE) to the gateway mobile switching center 11 (step S206). Thus, from then on, no incoming calls can arrive at the mobile station 10 from an external device.

As described above, the conventional system has the following drawbacks:

1) No incoming calls can arrive at the mobile station whose location information is erroneously registered in the new active home location register 2.
2) The network has no means for autonomously correcting and restoring the missing location registration information.

That is, as illustrated in FIG. 4, the location information in the profile of the mobile station 10 is absent in the new active home location register 2. Thus, no incoming calls can arrive the mobile station 10. Further, it is necessary, for returning the mobile station 10 from the current state in the system to an incoming enabling state that the location of the mobile station is reregistered in the new active home location register by moving the mobile station 10 to another location registration area and then (normally) registering the latest location of the mobile station 10 in this location registration area, as illustrated in FIG. 3.

Thus, the conventional system has a drawback in that an incoming disabling state of the mobile station 10 continues for a long time until the location of the mobile station 10 is registered in the new active home location register 2. Moreover, the conventional system has another drawback in that the network has no means for positively remedying such a state of the mobile station 10.

SUMMARY OF THE INVENTION

Accordingly, in view of the drawbacks of the conventional system, an object of the present invention is to provide a system and method for taking the following two measures to remedy a mobile station, the latest location registration information of which the system lacks, by switching between the home location registers. That is, an object of the present invention is to provide a system and method for retrieving mobile-station location registration information, which can enable incoming calls to such a mobile station and which enables the network to autonomously correct the location registration information of the mobile station.

Further, another object of the present invention is to provide a system and method for relieving mobile-station location registration information, which can correct and restore not only the missing mobile-station location registration information by switching between the home location registers, but the missing mobile-station location registration information of an ordinary mobile station.

To achieve the foregoing objects, according to an aspect of the present invention, there is provided a mobile communication system having home location registers, visitor location registers, mobile switching centers, and mobile stations. In this mobile communication system, each of the home location register comprises a rerouting information acquisition section for performing routing information acquisition processing when receiving, in response to a routing information acquisition message which is sent out to one of the visitor location registers, a response message indicating that a corresponding one of the mobile stations is not present.

Further, according to another aspect of the present invention, there is provided a mobile communication system having home location registers, visitor location registers, mobile switching centers, and mobile stations. In this mobile communication system, if one of the visitor location registers having received routing information acquisition message from one of the home location registers has no profile of a corresponding one of the mobile stations therein, the one of the visitor location registers performs routing information acquisition processing on another of the visitor location register and has a rerouting information acquisition section for informing the one of the home location registers of a result of the routing information acquisition processing.

Furthermore, according to still another aspect of the present invention, there is provided a mobile communication system having home location registers, visitor location registers, mobile switching centers, and mobile stations. In this mobile communication system, each of the visitor location registers has a location information relief processing section for sending to one of the home location registers a request to verify location registration information. The one of the home location registers has a location information verification processing section for verifying and collating the location register information with location registration information held therein in response to the request from the location information relief processing section and for correcting the location registration information according to a result of verifying and collating thereof.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 10 is a diagram showing another example (1) of the list indicating the placement of the visitor location registers;

FIG. 11 is a diagram showing another example (2) of the list indicating the placement of the visitor location registers;

DETAILED DESCRIPTION OF THE PREFERRED EMBODIMENTS

Figure 1:
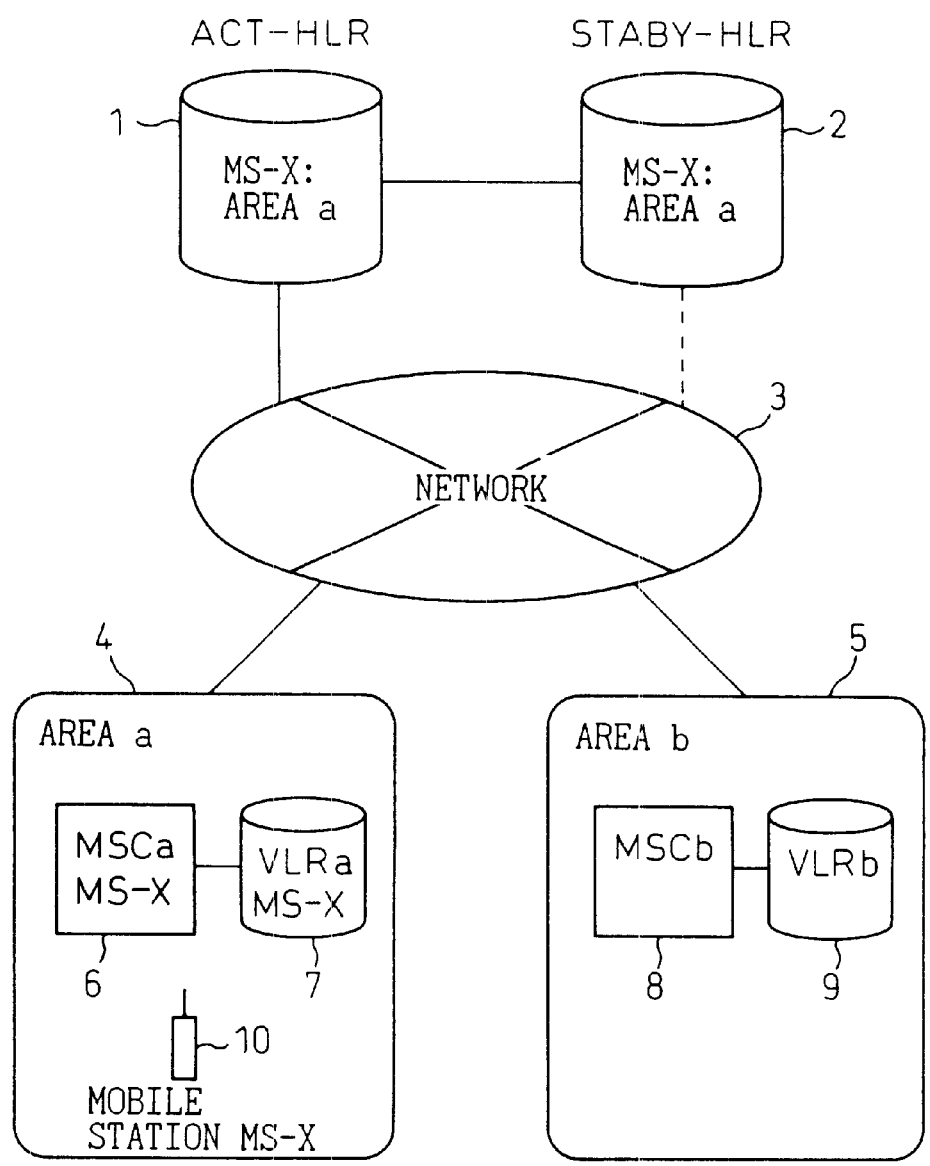
FIG. 1 is a diagram showing the constitution of an example of a mobile communication network.
Figure 2:
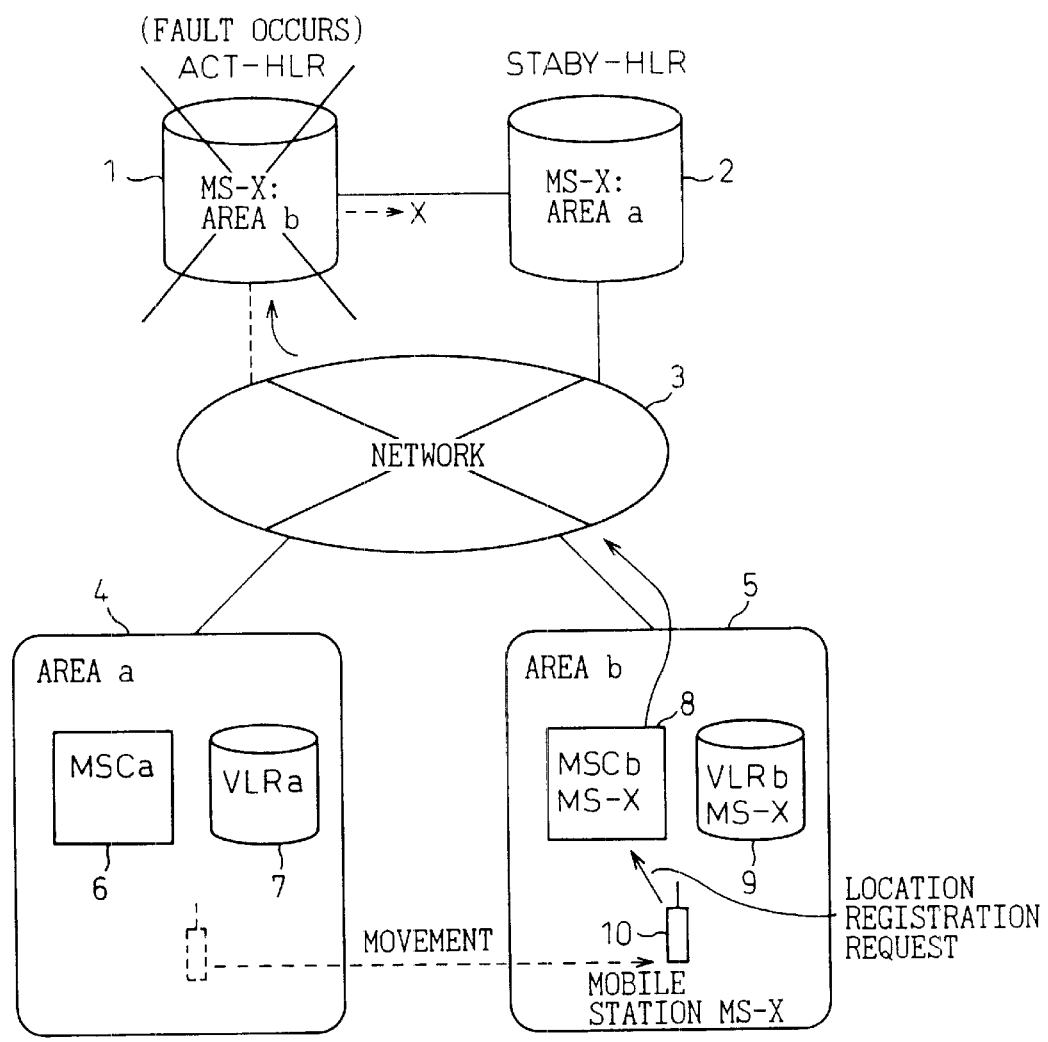
FIG. 2 is a diagram showing an example of the case that a fault occurs in the active home location register.

Hereinafter, supposing the situation illustrated in FIG. 2, (A) the constituent features of the embodiment enabling incoming calls to a mobile station, the location information of which the system lacks, and (B) the constituent features of the embodiment, by which the network autonomously corrects the location information, according to the present invention will be described.

Figure 4:
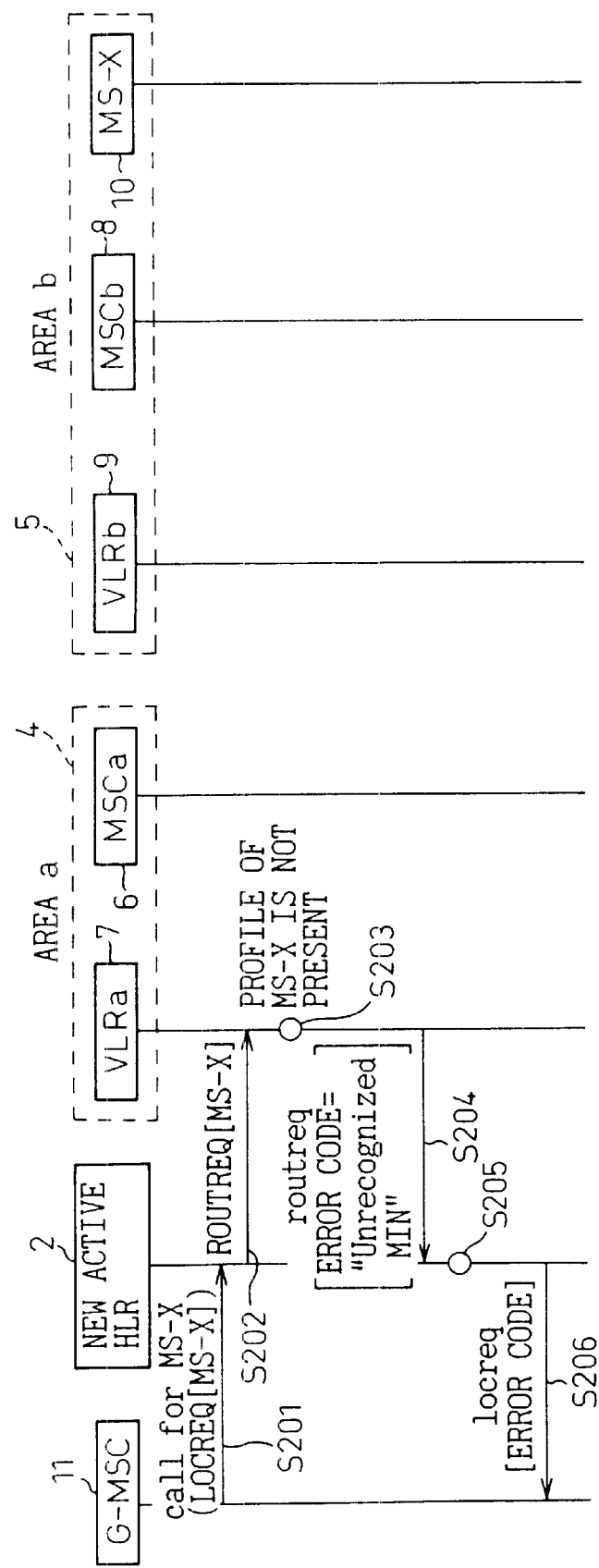
FIG. 4 is a diagram showing a conventional incoming call sequence.
Figure 5:
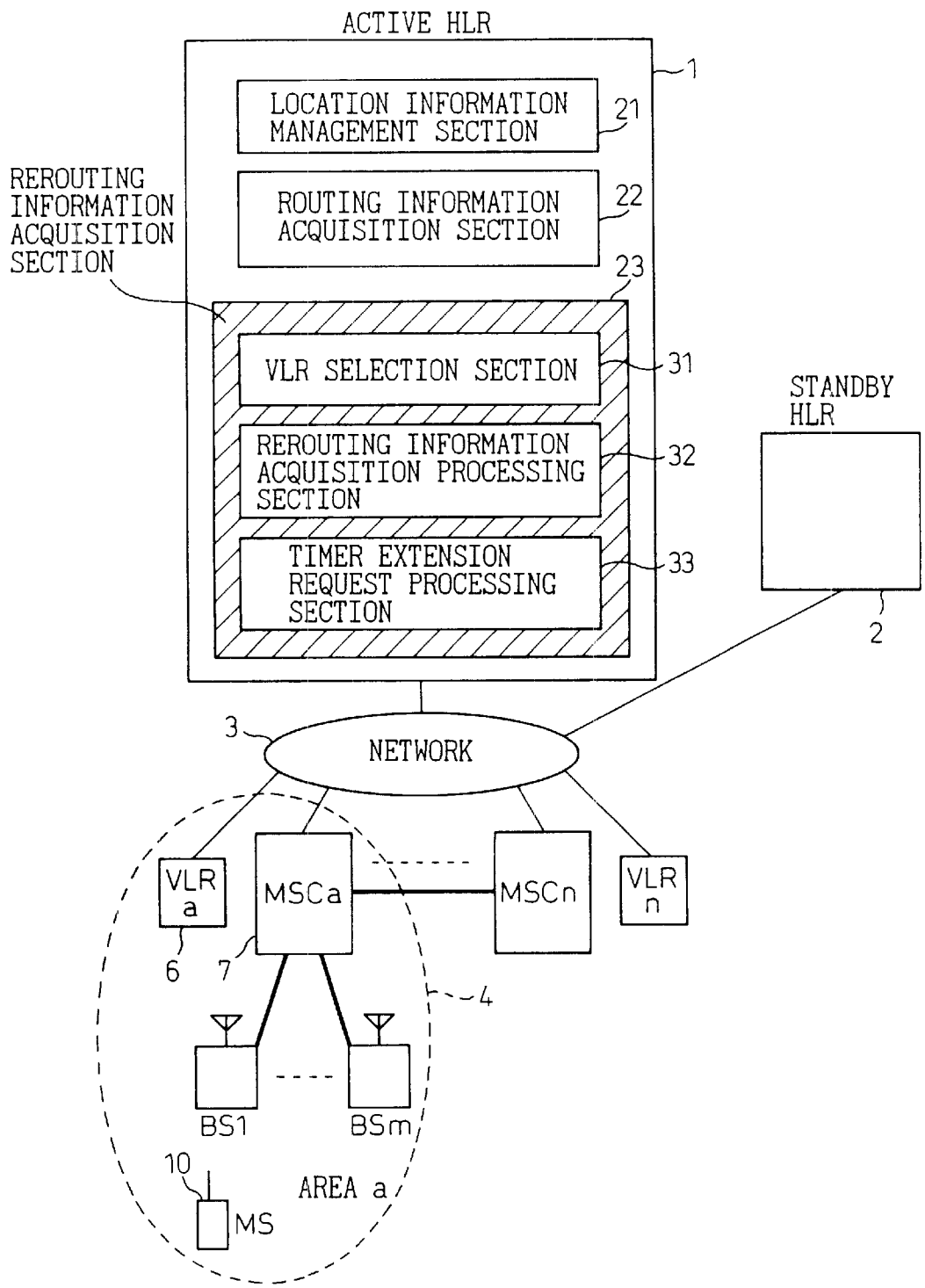
FIG. 5 is a diagram showing the constitution of an example of a home location register of the present invention.

(A) Constituent Features of Embodiment Enabling Incoming Calls to Mobile Station, Whose Location Information Is Missing FIG. 5 is a diagram showing an example of the constitution of an active home location register 1 of the present invention, which enables incoming calls to a mobile station. Incidentally, a rerouting information acquisition section 23 shown as a shaded part in this figure is newly provided in the active home location register 1 according to the present invention in such a manner as to have the following function. That is, when receiving a response message containing an error code in response to a routing information acquisition message (ROUTREQ) sent to the visitor location register illustrated in FIG. 4, the rerouting information acquisition section 23 performs rerouting information acquisition processing on another visitor location register.

The rerouting information acquisition section 23 comprises a visitor location register (VLR) selection section 31, a rerouting information acquisition processing section 32, and a timer extension request processing section 33. The visitor location register selection section 31 performs the selection of the visitor location register that performs rerouting. The rerouting information acquisition section 32 performing routing information acquisition processing on the selected visitor location register. Further, the timer extension request processing section 33 makes a request of a request source, which has requested routing information acquisition, to extend the time required to perform the rerouting information acquisition processing.

Hereunder, the embodiment of FIG. 5 will be described by referring to FIGS. 6 to 11. Incidentally, for convenience in understanding the present invention, the following description centers on the incoming call sequence according to the present invention. Moreover, in the following description, a related rerouting information acquisition control flow will be described by referring to FIGS. 7 and 8. Further, like reference characters denote like or corresponding steps in FIGS. 6, 7 and 8.

Figure 6:
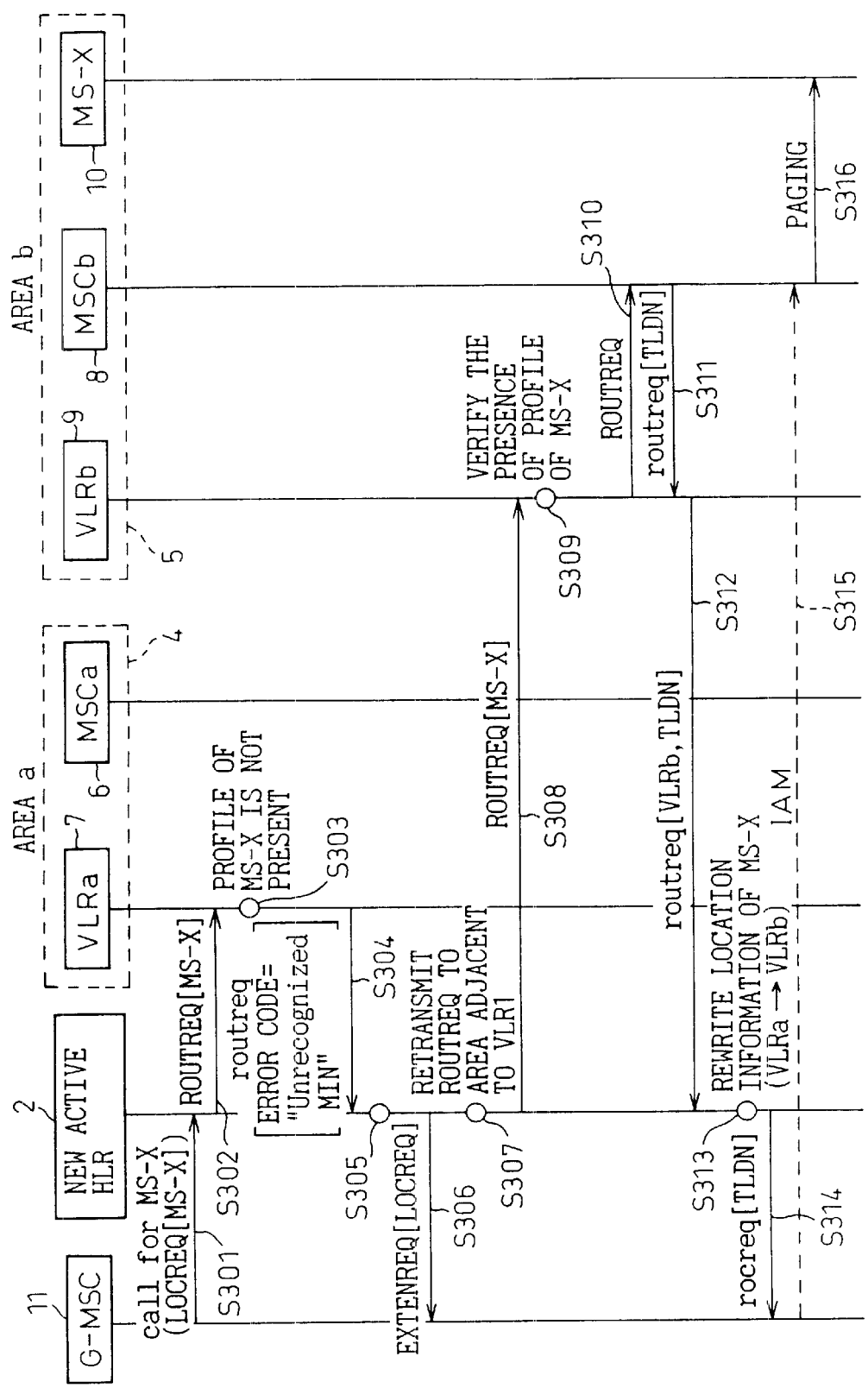
FIG. 6 is a diagram showing an example (1) of an incoming call sequence according to the present invention.
Figure 7:
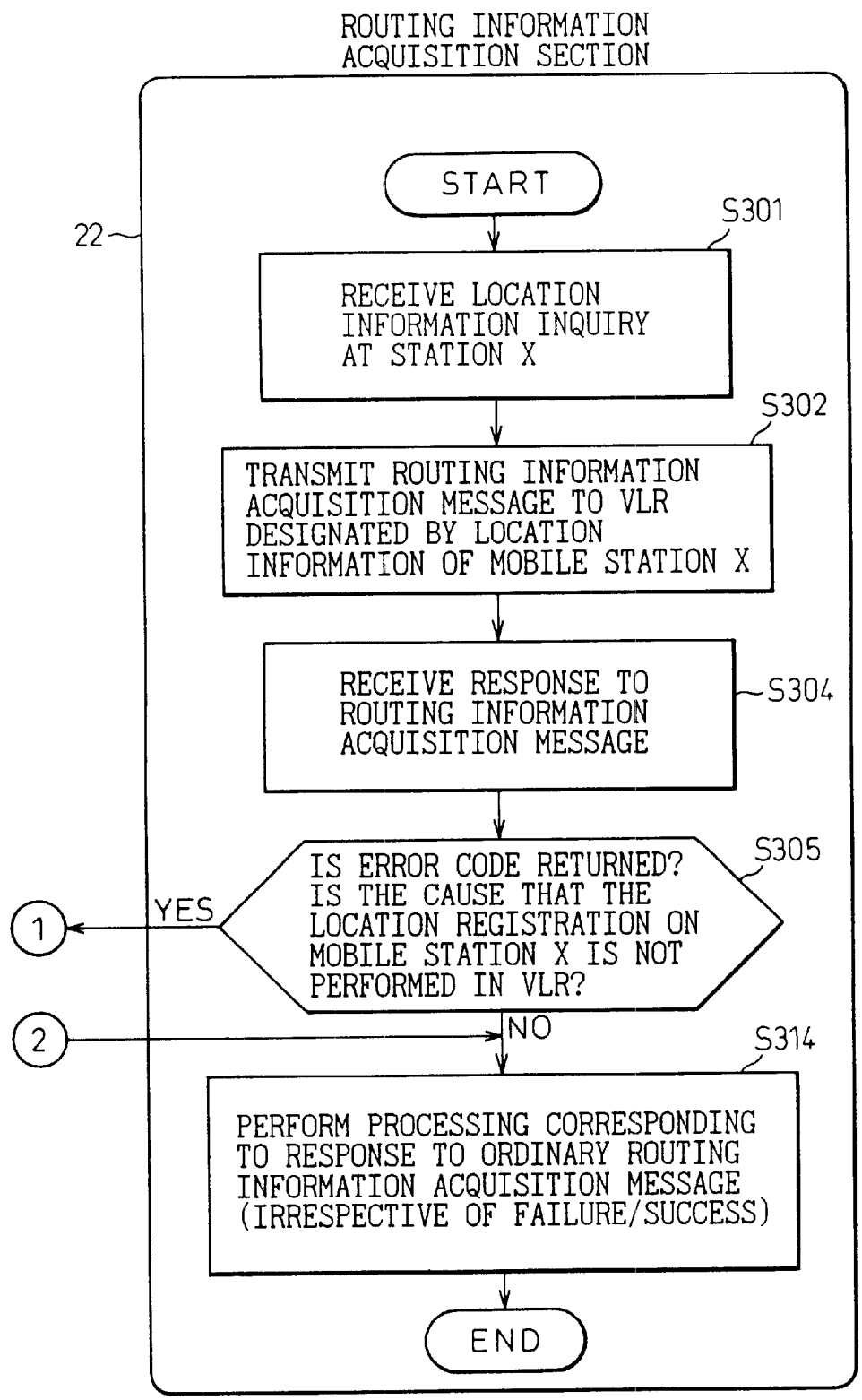
FIG. 7 is a flowchart showing an example of a control flow in a routing information acquisition section of the home location register.
Figure 8:
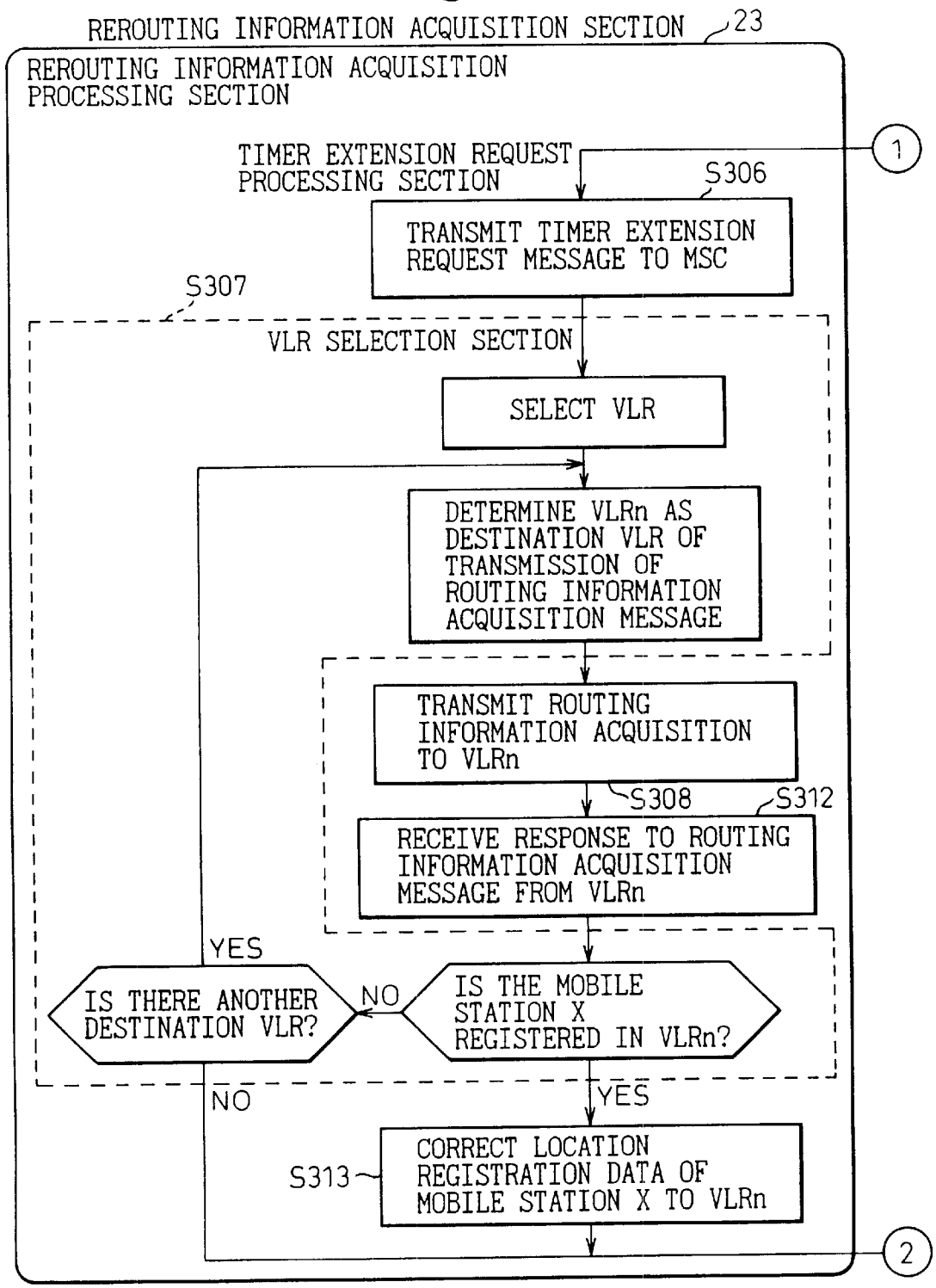
FIG. 8 is a flowchart showing an example of a control flow in a rerouting information acquisition section of the home location register.

As illustrated in FIG. 6, first, when the new active home location register (namely, the old home location register) 2 receives a location information inquiry message (LOCREQ) concerning the mobile station 10 through a gateway mobile switching center 11 from another network (step S301), the routing information acquisition section 22 (see FIGS. 5 and 7) of the new home location register 2 transmits a routing information acquisition message (ROUTREQ) to the visitor location register 7 according to the location information (representing a pointer to VLRa=AREAa) of the mobile station 10 (step S302).

The visitor location register 7 has no profile of the mobile station 10. Thus, the visitor location register 7 returns a response message (routreq) containing an error code (ErrorCode="UnrecognizedMIN") to the home location register 2 (step S304). Consequently, the routing information acquisition section 22 recognizes that the mobile station 10 is not present in the area 4 (step S305). The process up to this step is similar to the corresponding part of the conventional sequence illustrated in FIG. 4.

Then, the rerouting information acquisition section 23 (see FIGS. 5 and 8) according to the present invention instructs the timer extension request processing portion 33 to transmit a response waiting time (or timer) extension request message (EXTENREQ) to a gateway mobile switching center 11 (step S306), which is an originator having transmitted the location information inquiry message, before starting the rerouting information acquisition processing.

The timer extension request message processing is performed so as to prevent a time-out from occurring later during the rerouting information acquisition processing, thereby preventing a loss of an incoming call. Incidentally, such a time extension request message is not specified in IS-41-C. Therefore, such an "EXTENREQ" message is newly defined in this embodiment.

The gateway mobile switching center 11 having received the timer extension request message judges whether or not a response waiting time can be extended. If possible, the timer is extended. Incidentally, even if judged to be impossible, it is unnecessary to return a response to the home location register 2.

Next, the rerouting information acquisition section 23 instructs the a visitor location register selection section 31 to select another visitor location register (VLRb in this case) serving as a new destination to which a routing information acquisition message is transmitted again(step S307). Then, the rerouting information acquisition section 23 transmits a rerouting information acquisition message again (step S308). Incidentally, in the case that there are a plurality of visitor location registers to which the routing information acquisition message is transmitted again, a sequential transmission method or a multicast method may be employed as a method of transmitting the message (refer to the description of FIGS. 9A to 11 to be described later). Additionally, the former method is employed in the case of FIG. 8 (step S307).

The visitor location register 9 having received the routing information acquisition message has the profile of the mobile station 10 and transmits a routing information acquisition message (ROUTREQ) to the mobile switching center 8 in the same area 5 upon completion of predetermined processing (steps S309 and S310). The mobile switching center 8 assigns routing information (TLDN: Temporary Local Directory Number) and then returns this routing information to the visitor location register 9 (step S311).

The visitor location register 9 returns a response message (routreq), in which the aforementioned routing information is set, to the home location register 2 (step S312). The home location register 2 corrects the location registration information of the mobile station 10 according to the pointer to the visitor location register, which transmitted the response message with the routing information (TLDN), and then transmits the gateway mobile switching center 11, which is a call originator of the location information inquiry, a response message (locreq) responding thereto (steps S313 and S314).

As described above, hitherto, the routing information acquisition message is returned to the mobile switching center from the home location register through the visitor location register in the incoming call process. Similarly, as in the case of this embodiment, if the location registration information registered in the home location register is incorrect, error information is returned thereto as a response. Thus, the incoming call is not connected to the mobile station.

However, the home location register can judge from this error information in its own right that "the location registration information is incorrect". That is, the error code represented by this error information means that the designated MIN (namely, the mobile-station identification number) is not recognized, namely, that the mobile station designated by this MIN is not present in the visitor location register. Therefore, the call incoming to this mobile station is enabled by performing the following steps according to the present invention from then on to thereby retransmit the message.

(i) A routing information acquisition message is transmitted again to a visitor location register, which is different to the visitor location register to which the routing information acquisition message is first transmitted.

(ii) In the case that the mobile station is present in an area corresponding to the visitor location register to which the routing information acquisition message is retransmitted, ordinary processing is performed in the visitor location register/the mobile switching center. Then, a response is returned to the home location register.

(iii) A response indicating that "this mobile station is not present" is returned thereto from the visitor location register provided in the area, in which this mobile station is not present. The home location register ignores such a response.

The operation of performing these steps enables the call incoming to the mobile station, the incorrect location information of which is registered.

Meanwhile, there are various methods by which the aforementioned visitor location register selection section 31 selects a visitor location register serving as a new destination of the routing information acquisition message according to VLR placement information.

Figures 9A, 9B:
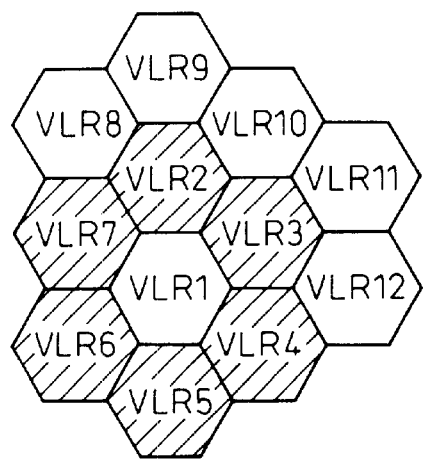
FIG. 9A is a diagram showing an example of the manner of placement of visitor location registers.
FIG. 9B is a diagram showing an example of a list indicating the placement of the visitor location registers.

FIGS. 9A and 9B illustrate the manner of placement of the visitor location registers and an example of a list indicating the placement of the visitor location registers, respectively. Further, FIGS. 10 and 11 show other examples of the list indicating the placement of the visitor location registers.

It is now assumed that the visitor location registers are placed in the manner as illustrated in FIG. 9A. FIG. 9B illustrates an example of the list which indicates the placement of the visitor location registers and which is used for transmitting the routing information acquisition message to all of the visitor location registers.

It is sufficient for transmitting the rerouting information from the visitor location register selection section 31 to all the visitor location registers that this selection section has a list, which is illustrated in FIG. 9B and which indicates identification information (VLR-ID) of all the visitor location registers placed in the mobile communication system. In this case, the selection of the visitor location register is performed by first removing from the list the identification information indicating the visitor location register corresponding to the origin of the list and then serially or randomly choosing one of the visitor location registers indicated by the remaining identification information of the list.

FIGS. 10 and 11 illustrate other examples of the list indicating the placement of the visitor location registers.

In the case of the example shown in FIG. 10, the visitor location registers adjoining, for example, the visitor location register (VLR) 1, can be easily selected by referring to a list (hereunder referred to an adjoining VLR list (in this case, a VLR1 list shown in an upper part of this figure) of identification numbers of the adjoining visitor location visitors, which are indicated by identification information. Similarly, the visitor location registers adjoining the visitor location register (VLR) 2 can be easily selected by referring to a VLR2 list (shown in a lower part of this figure).

The advantages of the method of preferentially selecting visitor location registers provided in the vicinity of a certain visitor location register as destinations of a routing information acquisition message to be transmitted are obtained depending upon a time period (hereunder referred to as a reflecting period), by which the updating of the database of the standby home location register 2 is delayed from the updating of the database of the active home location register 1. It is, however, expected that the aforementioned reflecting period is considerably shorter than an average period (usually, several hours) required for registration of the location of the mobile station 10.

This is because there is extremely high possibility that the "current (or latest) mobile location registration area" of the mobile station 10, whose latest location registration information is not reflected by the new active home location register 2 owing to the switching between the home location registers 1 and 2, is an area placed in the vicinity of (for instance, an area being adjacent to) the area registered in the home location register 2. Thus, information on a result of the selection obtained by listing up the visitor location registers in the order of the proximity to the origin visitor location register 8 is returned to the rerouting information acquisition processing section 32, from which routing information acquisition messages are sequentially transmitted.

In the case of the example of FIG. 11, a entry (or history) indicating which adjacent visitor location register the mobile station 10 moves to is added to the list of the example of FIG. 10. This degree is updated every location registration. The list of FIG. 11 corresponds to the adjoining VLR list of the VLR1 shown in the upper part of FIG. 10. The visitor location register is selected in a descending degree order (from VLR7 through VLR6, VLR5, VLR4, and VLR3 to VLR2) by using the information of the example of FIG. 11 from a plurality of adjacent visitor location registers that are candidates for a destination of transmission of the routing information acquisition message.

This increases the probability, at which the mobile station is present in the area corresponding to the selected visitor location register, still more. Although the degree is not provided correspondingly to each of the mobile stations in the case of this example, the degree may be established correspondingly to each of the mobile stations, instead of the adjoining VLR list. The visitor location register selection section 31 can use various methods of selecting an area, in which the mobile station is present, by singly performing one of such methods or performing a combination thereof, in view of traffic in the network.

If the destinations of retransmission of the routing information acquisition message are set to be all the visitor location registers provided in the network, the incoming call to the mobile station can be reliably achieved. However, the traffic in the network is extremely increased by this. On the other hand, if the destination of retransmission of the routing information acquisition message is limited to the visitor location registers placed in the vicinity of a visitor location register, to which this message is first transmitted, and the aforementioned degree is taken into consideration, an increase in the traffic in the network can be reliably suppressed.

FIGS. 12 to 15 illustrate other examples of the constitution of the location registers of the present invention enabling incoming call to the mobile station, whose location information is missing, in addition to the examples illustrated in FIGS. 5 to 11.

Figure 12:
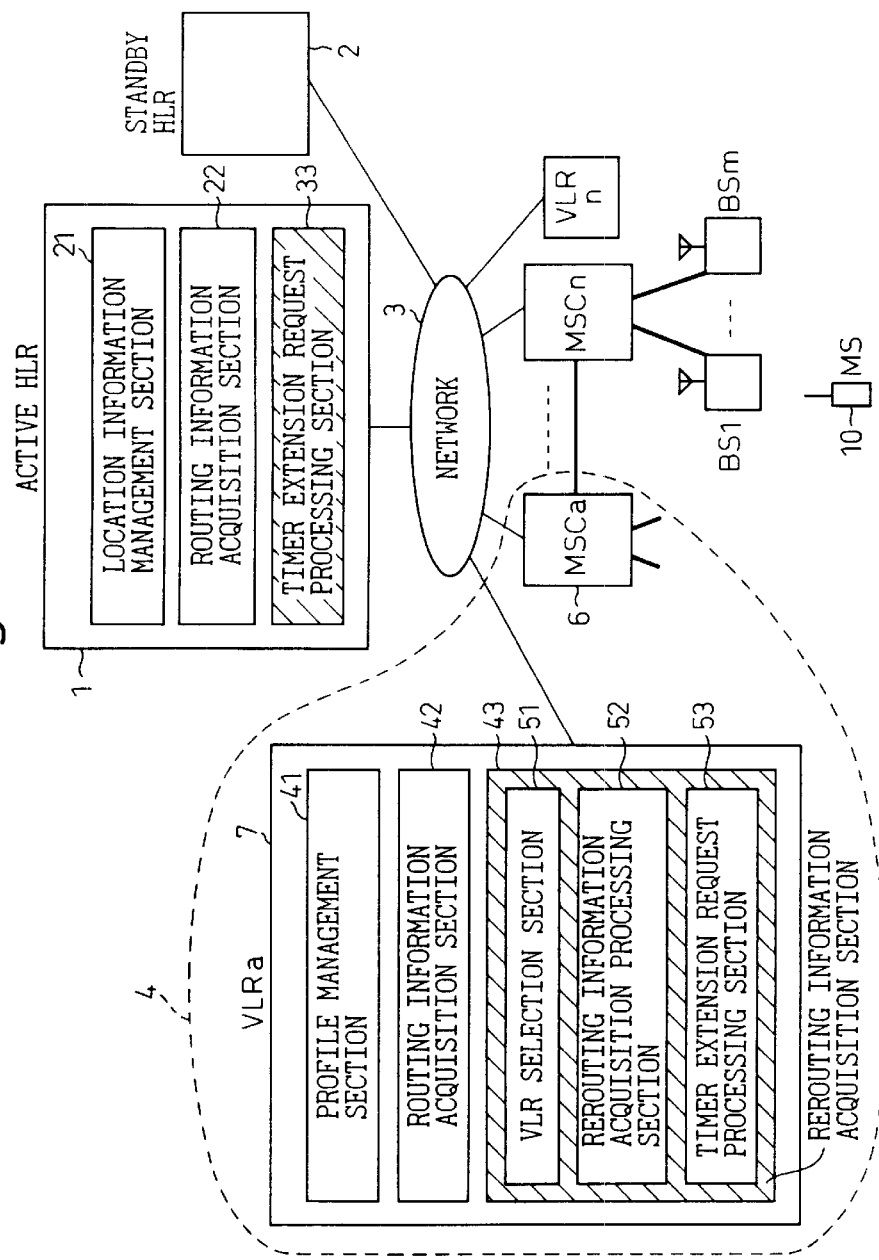
FIG. 12 is a diagram showing an example of the constitution of the visitor location registers of the present invention enabling incoming call.

Though different from FIG. 5 showing the constitution of the active home location register, FIG. 12 illustrates an example in which a section for performing the functions of the active home location register of FIG. 5 is provided in the visitor location register. That is, the shaded rerouting information acquisition section 43 in FIG. 12 has functional sections 51 to 53, which are similar to the corresponding sections of the rerouting information acquisition section 23 of FIG. 5. Moreover, operations of such functional sections are similar to those of the corresponding sections of FIG. 5.

Figure 13:
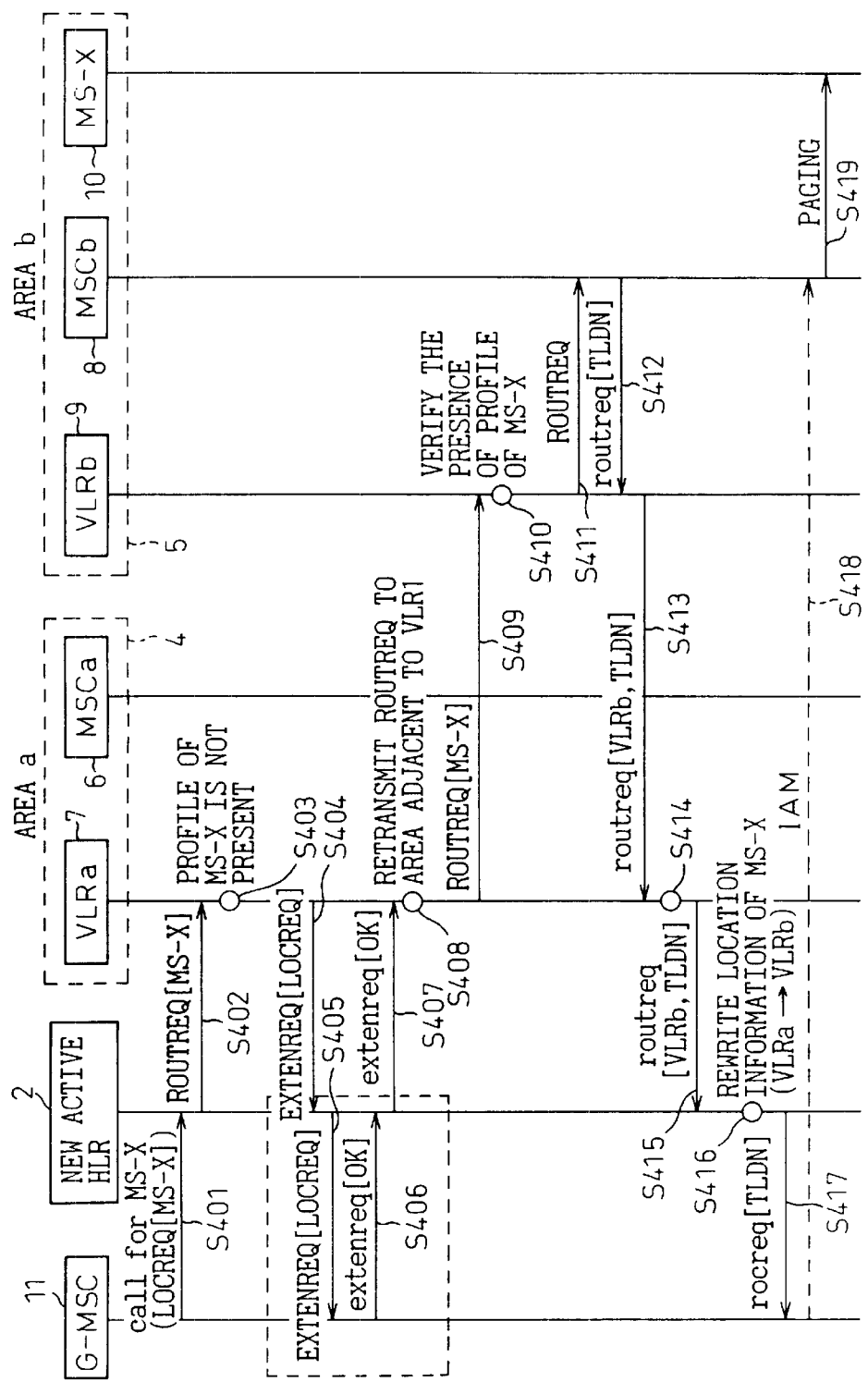
FIG. 13 is a diagram showing an example (2) of the incoming call sequence according to the present invention.
Figure 14:
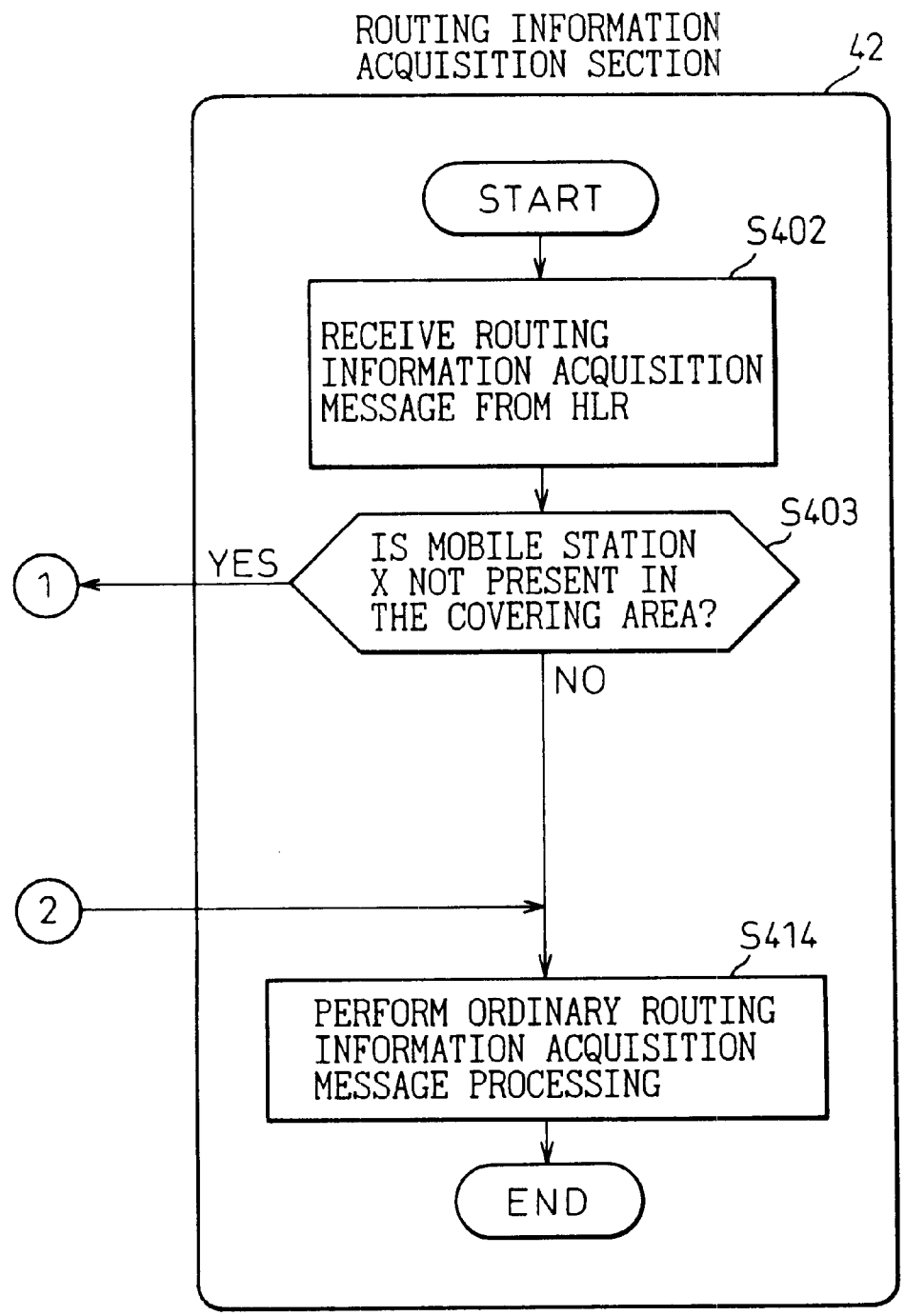
FIG. 14 is a flowchart showing an example of a control flow in a routing information acquisition section of the visitor location register.
Figure 15:
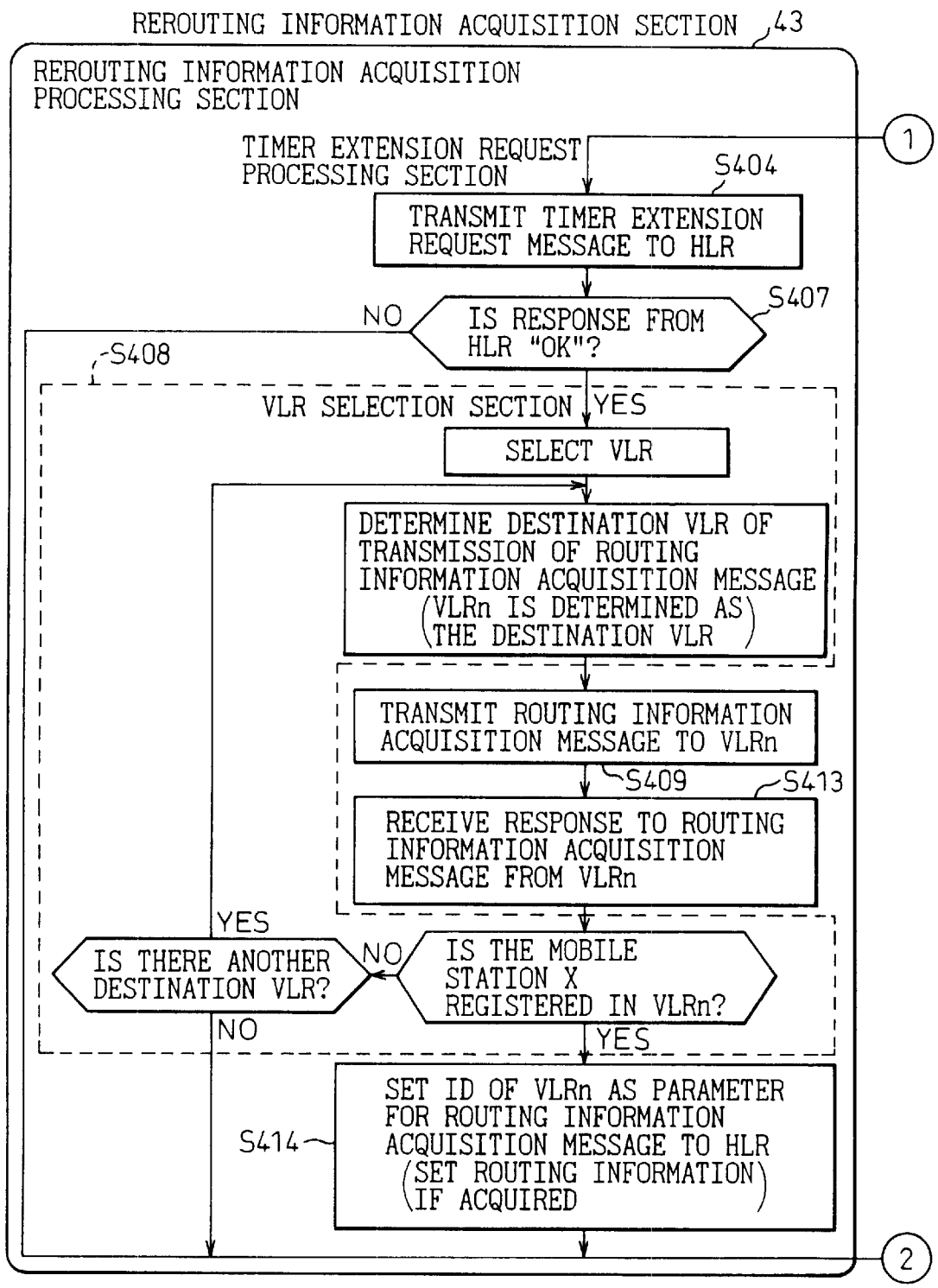
FIG. 15 is a flowchart showing an example of a control flow in a rerouting information acquisition section of the visitor location register.

In the case of these examples, the following description thereof centers on the incoming call sequence of FIG. 13 according to the present invention. Moreover, in the following description, a related rerouting information acquisition control flow will be described by referring to FIGS. 14 and 15. Further, like reference characters denote like or corresponding steps in FIGS. 13, 14 and 15.

As is seen from FIG. 13, the process from the step of transmitting a location information inquiry message (LOCREQ) concerning the mobile station 10 to the new active home location register (namely, the old home location register) 2 through a gateway mobile switching center 11 from another network (step S401) to the step at which the new home location register 2 transmits a routing information acquisition message (ROUTREQ) to the visitor location register 7 according to the location information (representing a pointer to VLRa=AREAa) of the mobile station 10 (steps S401 and S402) is similar to the corresponding process of FIG. 6.

In the case of this example, the visitor location register 7 having no profile of the mobile station 10 causes the timer extension request processing potion 53 to return a response waiting time (or timer) extension request message (EXTENREQ) to the home location register 2, instead of returning a response message (routreq) containing an error code thereto (steps S404). When the timer extension request processing section 33 of the home location register 2 receives the message, the processing section 33 transmits the same extension request message to the gateway mobile switching center 11 to thereby request the extension of the response standby time corresponding to a response to the location information inquiry message (steps S405 and S406).

Incidentally, generally, the processing of the timer extension request message from the home location register to the gateway mobile switching center is necessary for relieving the incoming call (because a call loss occurs when a time-out is caused by the rerouting information acquisition processing). However, the timer extension processing at the gateway mobile switching center is not necessary for an operation of correcting the location registration information of the mobile station. Thus, the aforementioned processing is indicated by being enclosed with dotted lines in these figure (the previously described step S306 of FIG. 6 is considered to be similar thereto).

When receiving an affirmative response "OK" to the timer extension request from the home location register 2 (step S407), the visitor location register selection section 51 of the visitor location register 7 selects the visitor location register, which is the destination of transmission of the routing information acquisition message, by performing a method similar to that described with reference to FIGS. 9A to 11. Thus, a routing information acquisition message (ROUTREQ) is transmitted from the rerouting information acquisition processing section 52 to the visitor location register 9 (steps S408 to S409).

Meanwhile, the IS-41-C does not define the routing information acquisition message as being exchanged between the visitor location registers. It is supposed that such an exchange of the routing information acquisition messages is enabled in this example. Alternatively, a message for rerouting information acquisition may be defined.

The process sequence following this step is similar to the corresponding sequence described with reference to FIG. 6. Incidentally, the process sequence of FIG. 15 differs from that of FIG. 6 in that the rerouting information acquisition section 43 of the visitor location register 7 having first received the routing information acquisition message performs the rerouting information acquisition processing between the visitor location registers, instead of the home location register 2 (step S408 to S413 of FIG. 15).

In the case of this embodiment, when the visitor location register 7 receives from the visitor location register 9 a response message (routreq message) indicating that the mobile station 10 is present in the area, the register 7 adds the assigned routing information and ID (for example, VLRb) of the visitor location register 9 to the message and returns a response message to the home location register 2 (steps S413 and S415). When the home location register 2 verifies that the response message from the visitor location register 7 contains the ID (namely, VLRb) of the visitor location register 9, the location register 2 updates the location registration information of the mobile station 10 (step S416) and transmits a location information inquiry response message (locreq) to the gateway mobile switching center 11, which is an originator (step S417).

(B) Constituent Features of Embodiment for Enabling Network to Autonomously to Correct Location Registration Information Next, the constituent features of the embodiment for enabling the network to autonomously correct the location registration information of the mobile station will be described hereinbelow.

First, with the aforementioned constituent features enabling the incoming call to the mobile station, the home location register knows the correct area in which the mobile station is present. Consequently, the location registration information of the mobile station is corrected to the correct area.

FIGS. 16 to 19 illustrate the constitution of an embodiment in which, when an active home location register is switched to a standby home location register owing to an occurrence of a fault, a visitor location register having detected this switching operation under the control thereof and a new active home location register (namely, the standby home location register) verify the correct location registration information of the mobile station according to the present invention.

Figure 16:
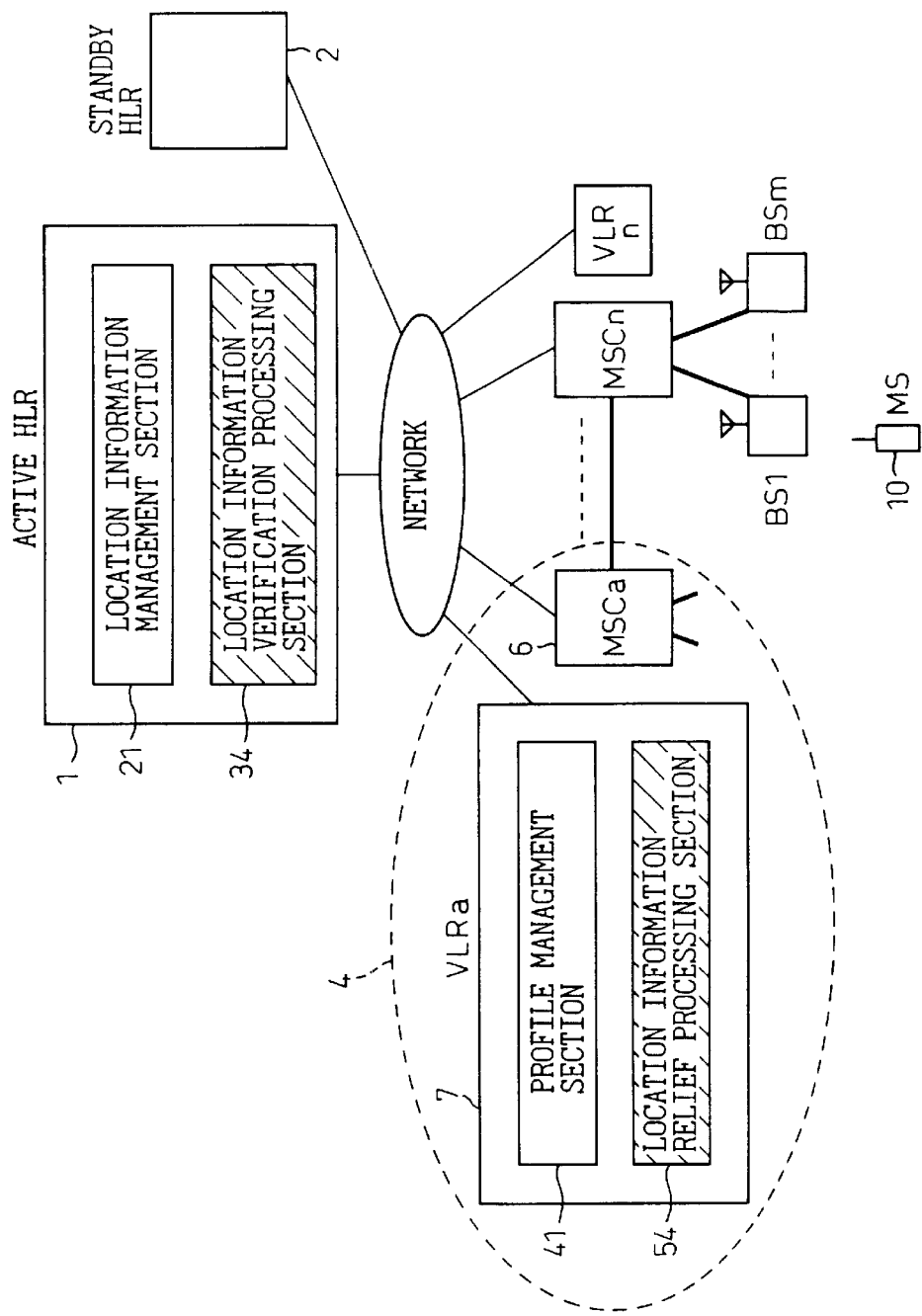
FIG. 16 is a diagram showing an example of the constitution of the system of the present invention for verifying location registration information when the home location register is switched.

FIG. 16 shows an example of the constitution of the system of the present invention for verifying the location registration information when the home location register is switched.

Figure 18:
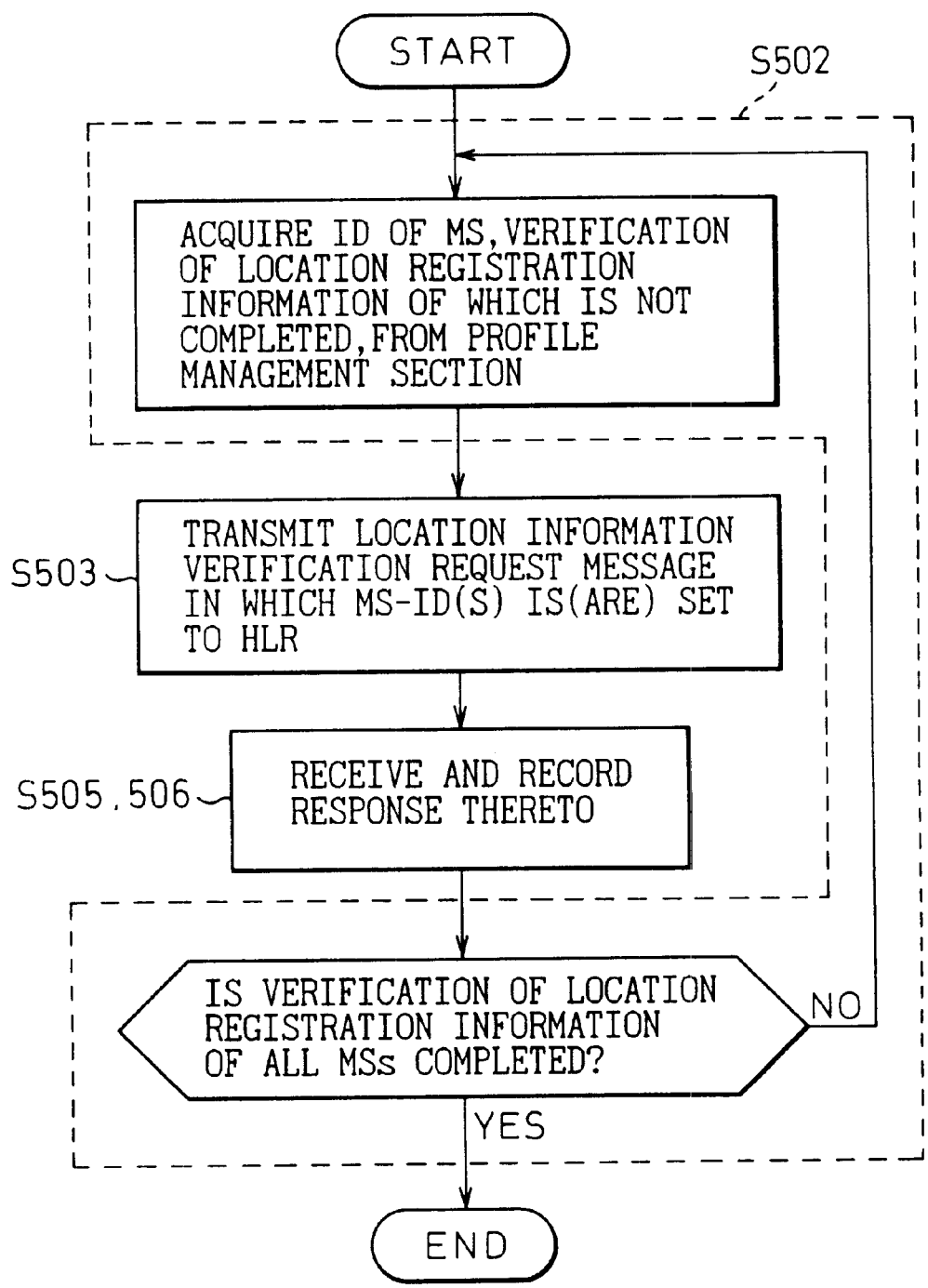
FIG. 18 is a flowchart showing an example of a control flow in a location information relief processing section of the visitor location register.
Figure 19:
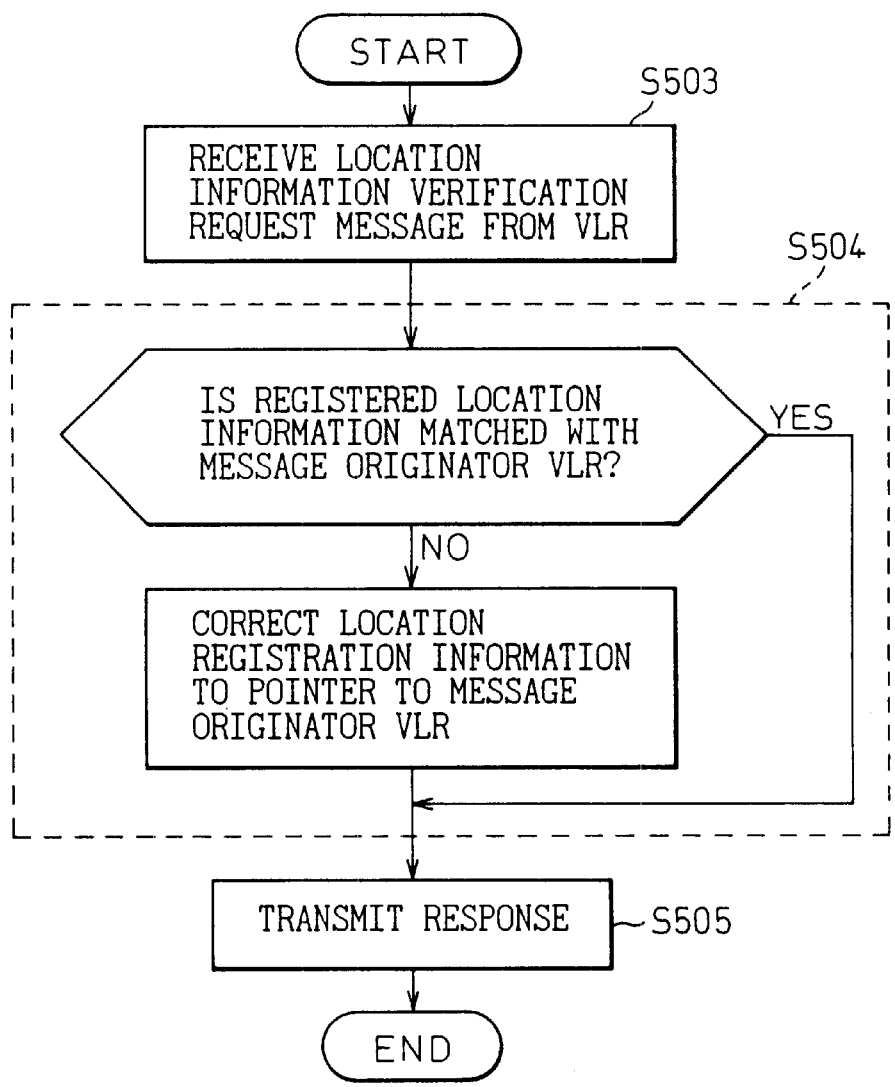
FIG. 19 is a flowchart showing an example of a control flow in a location information verification processing section of the home location register.

As shown in this figure, a location information verification processing section 34 is provided in each of the active and standby home location registers 1 and 2. Further, a location information relief processing section 54 according to the present invention is provided in each of all the visitor location registers 7. Examples of operations of these sections are illustrated in FIGS. 18 and 19. The following description of this embodiment centers on the location registration information verification sequence of FIG. 17 according to the present invention. Moreover, in the following description, related points will be described by referring to FIGS. 18 and 19. Incidentally, like step numbers designate corresponding steps in FIGS. 17, 18, and 19.

Figure 17:
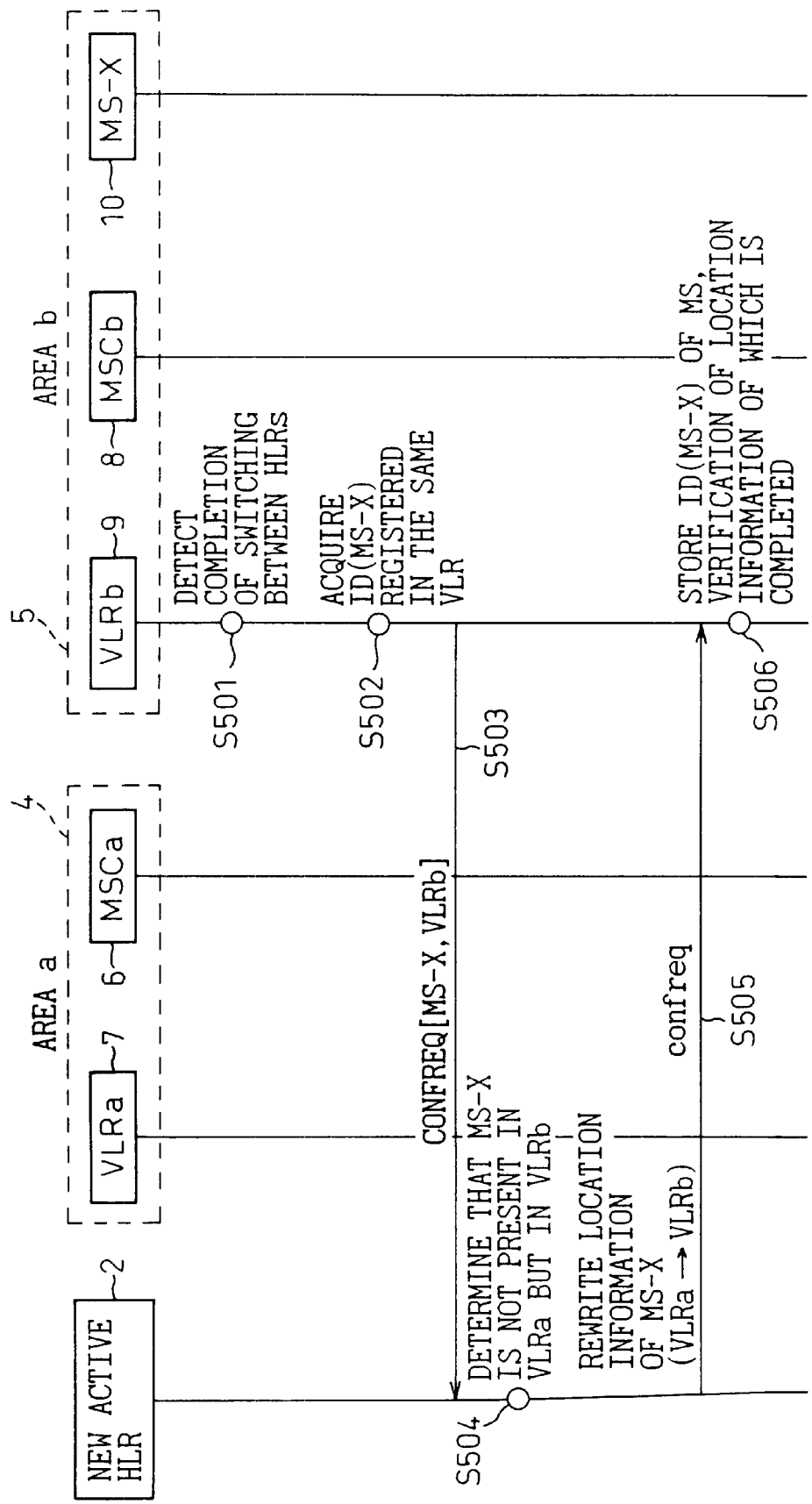
FIG. 17 is a diagram showing an example of a location registration information verification sequence.

As shown in FIG. 17, the visitor location register 9 detects the switching between the home location registers 1 and 2 (step S501) and thus recognizes the necessity for verifying the location registration information. For simplicity of description of this operation with reference to the drawing, only the visitor location register 9 has been described. The aforementioned operation is performed by all the visitor location registers under the control of the home location register.

The location information relief processing section 54 of the visitor location register 9 (see FIGS. 16 and 18) acquires the identification information (MS-ID, in the case of this embodiment, MS-X) of the mobile station (step S502), whose location is registered in the visitor location register thereof from the profile management section 41. Then, the processing section 54 transmits a location registration information comfirmation request message (CONFREQ), in which the identification information is set, to the new active home location register 2.

The location information verification processing section 34 (see FIGS. 16 and 19) of the home location register 2 checks whether or not the visitor location register 9, which is an originator of a message corresponding to the identification information of the mobile station set in the received location registration information verification request message, is correctly registered. If not correctly registered, the processing section 34 corrects the location information of the mobile station (step S504). The home location register 2 transmits the location registration information comfirmation response message (confreq) to the visitor location register 9, which stores information representing the mobile stations, the verification of the location registration information of which is completed (steps S505 and S506).

In the case of this embodiment, upon completion of the switching between the home location registers, the verification of the location registration information is performed.

The system may be adapted so that the verification of the location registration information is performed when a processing load on the visitor location register is low after the switching between the home location registers. Further, identification information on a plurality of mobile stations may be set in a single location registration information verification request message so as to reduce the number of transfers of messages between the home location register and the visitor location register.

Moreover, in the case of this embodiment, the verification of the location registration information is performed on all the mobile stations registered in each of the visitor location registers. However, the reflecting period (for example, a period of 5 minutes) required to cause the contents of the database of the active home location register to be reflected in the standby home location register may be taken into consideration so as to increase the efficiency of the verification processing of the location registration information.

For instance, the system is adapted so that the verification of the location registration information is not performed on the mobile stations, whose location registration information considered as not being missing (that is, the mobile stations considered to have the latest location information thereof already registered in the standby home location register) apparently from the reflecting period of the standby home location register and the location registration execution time corresponding to each of the mobile stations. Consequently, the processing load on the home location register and the traffic in the network are reduced.

Referring next to FIGS. 20 to 27, there is shown an example of the constitution of the system for verifying and correcting the location registration information of a mobile station when a transmission request is issued by the mobile station.

Usually, when a transmission request is issued from a mobile station, this request is transmitted through a mobile switching center and then, authentication processing is performed by a visitor location register provided in an area, in which the mobile station is present, or a home location register. At that time, according to the present invention, the visitor location register having received an authentication request judges whether or not the authentication request is made for authentication at a first transmission after the location of the mobile station is registered in the same visitor location register.

Then, if so, the visitor location register transmits an authentication request message to the home location register. Subsequently, the home location register checks whether or not the location registration information of the mobile station is matched with the visitor location register that is an originator of the authentication request message. If it is not matched, the home location register corrects the location registration information to the pointer to the visitor location register, which is the originator of the authentication request message.

The aforementioned expression "judges whether or not the authentication request is made for authentication at a first transmission after the location of the mobile station is registered in the same visitor location register" has the following meaning. As described above with reference to FIG. 3, when a mobile station moves to an area of the visitor location register, the location registration thereof is performed. However, if there is no transmission from or incoming call to the mobile station after this registration thereof, it can be judged that the current location registration information of the mobile station may be erroneous.

Meanwhile, if there is an incoming call to the mobile station, the location registration information of the mobile station, whose location information is missing, is corrected in the home location register, as described above by referring to FIGS. 6 and 13. However, in the case that the mobile station performs transmission processing when the location information thereof is missing, the location information thereof is not corrected. Thus, upon such a transmission, the location information should be corrected. Therefore, this embodiment has a constitution adapted to correct the location registration information of the mobile station, whose location information is missing, in the home location register only when a transmission is performed from the mobile station.

In the case of this embodiment, when a transmission is performed from a mobile station, needless to say, this mobile station is present in the area in which the corresponding visitor location register is provided. Thus, only at the "first transmission after the location of the mobile station is registered in the same visitor location register", is an authentication request message containing the correct identification information of the mobile station and the information on the originator visitor location register transmitted to the home location register so as to ask the home location register to judge on the necessity of the correction of the location registration information and perform the correction thereof. Then, the home location register compares the received correct information with the location registration information of the mobile station. If not matched, the home location register corrects the location registration information to the received correct information (namely, the pointer to the originator visitor location register). Consequently, the mobile station, whose location registration information may be missing, is relieved.

Hereinafter, an example of the aforementioned processing to be performed only during the transmission will be described.

Figure 20:
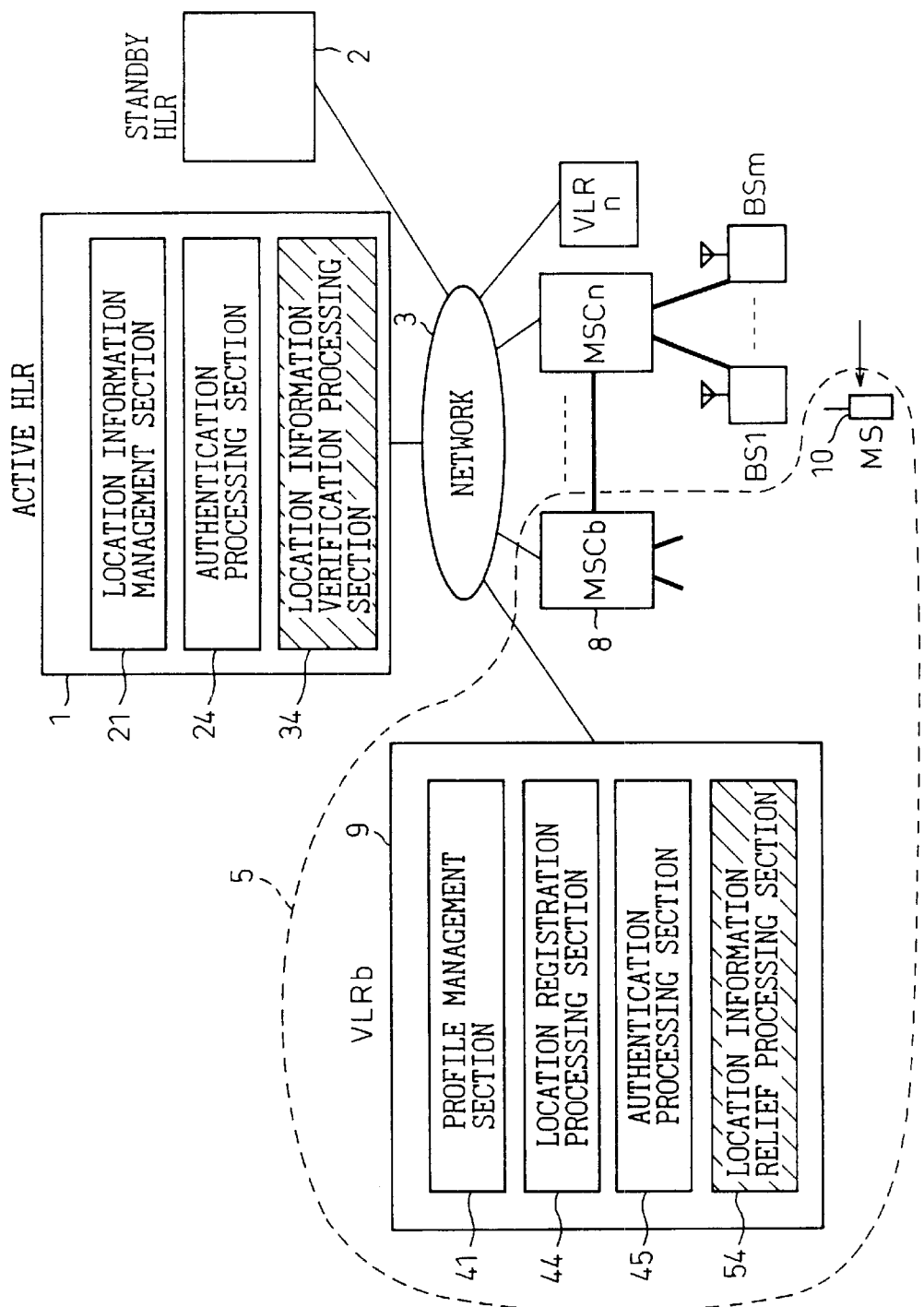
FIG. 20 is a diagram showing an example of the constitution of the system of the present invention for autonomously correcting location registration information a call is originated.

FIG. 20 shows an example of the constitution of the system of the present invention for autonomously correcting location registration information when a call is originated.

As shown in FIG. 20, the location information verification processing section 34 of the present invention is provided in each of the active and standby home location registers 1 and 2. Further, the location information relief processing section 54 is provided in each of all the visitor location registers 7 and so forth.

Incidentally, the location information verification processing section 34 and the location information relief processing section 54 are provided in the system shown in FIG. 16. However, those sections 34 and 54 of this embodiment have additional new functions, and are provided therein irrespectively of those sections of FIG. 16. Hereunder, an example of a location registration processing sequence and an example of a control flow thereof respectively illustrated in FIGS. 21 and 22 will be described, separately from an example of a transmission processing sequence and an example of a control flow thereof illustrated in FIGS. 23 to 27. The following description thereof centers on each of the examples of the sequences. Especially, related parts, which include steps designated by like character numbers, in the flows will be described below.

Figure 21:
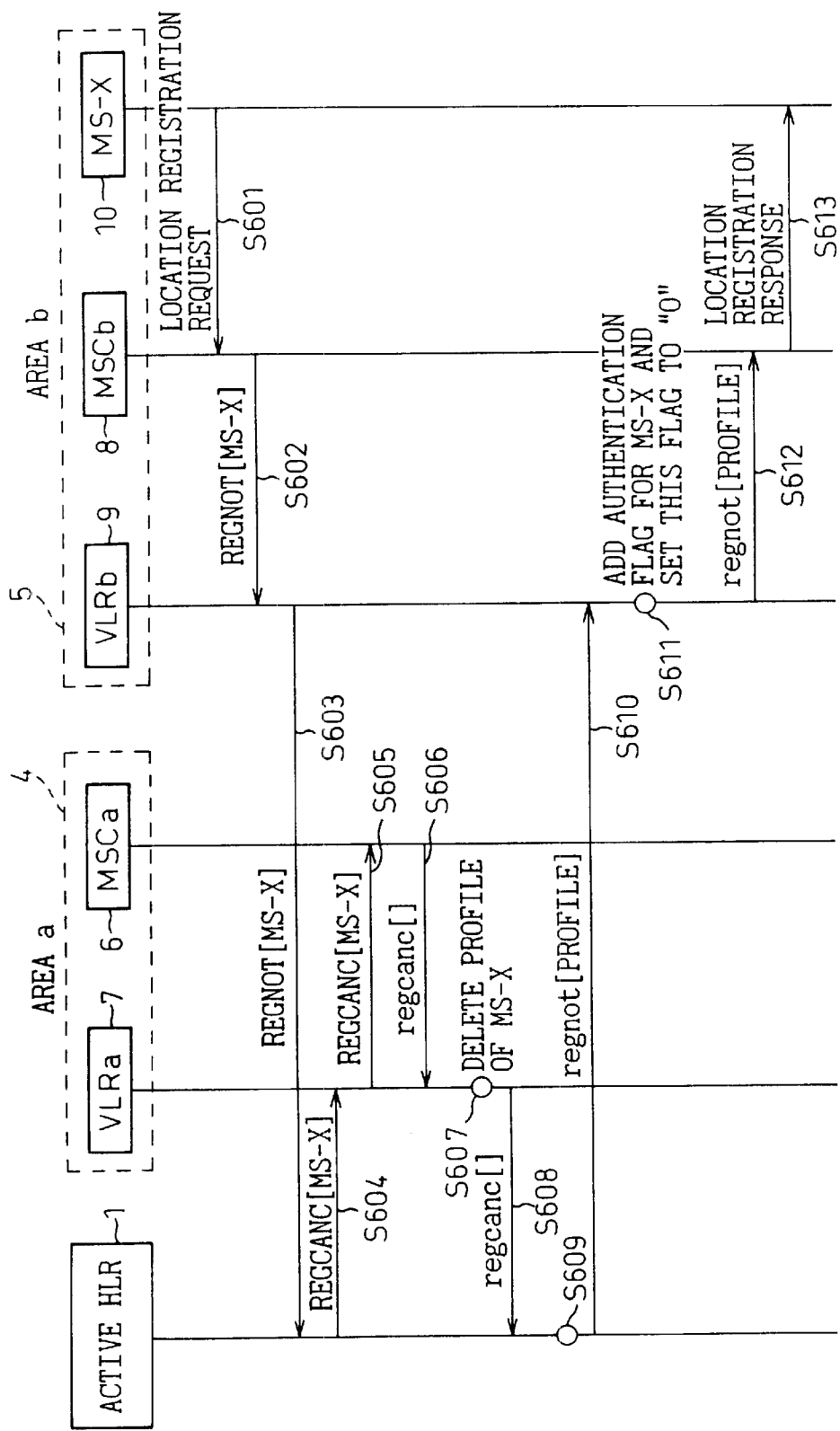
FIG. 21 is a diagram showing an example of a location registration sequence according to the present invention.

FIG. 21 illustrates an example of the location registration sequence according to the present invention.

Figure 3:
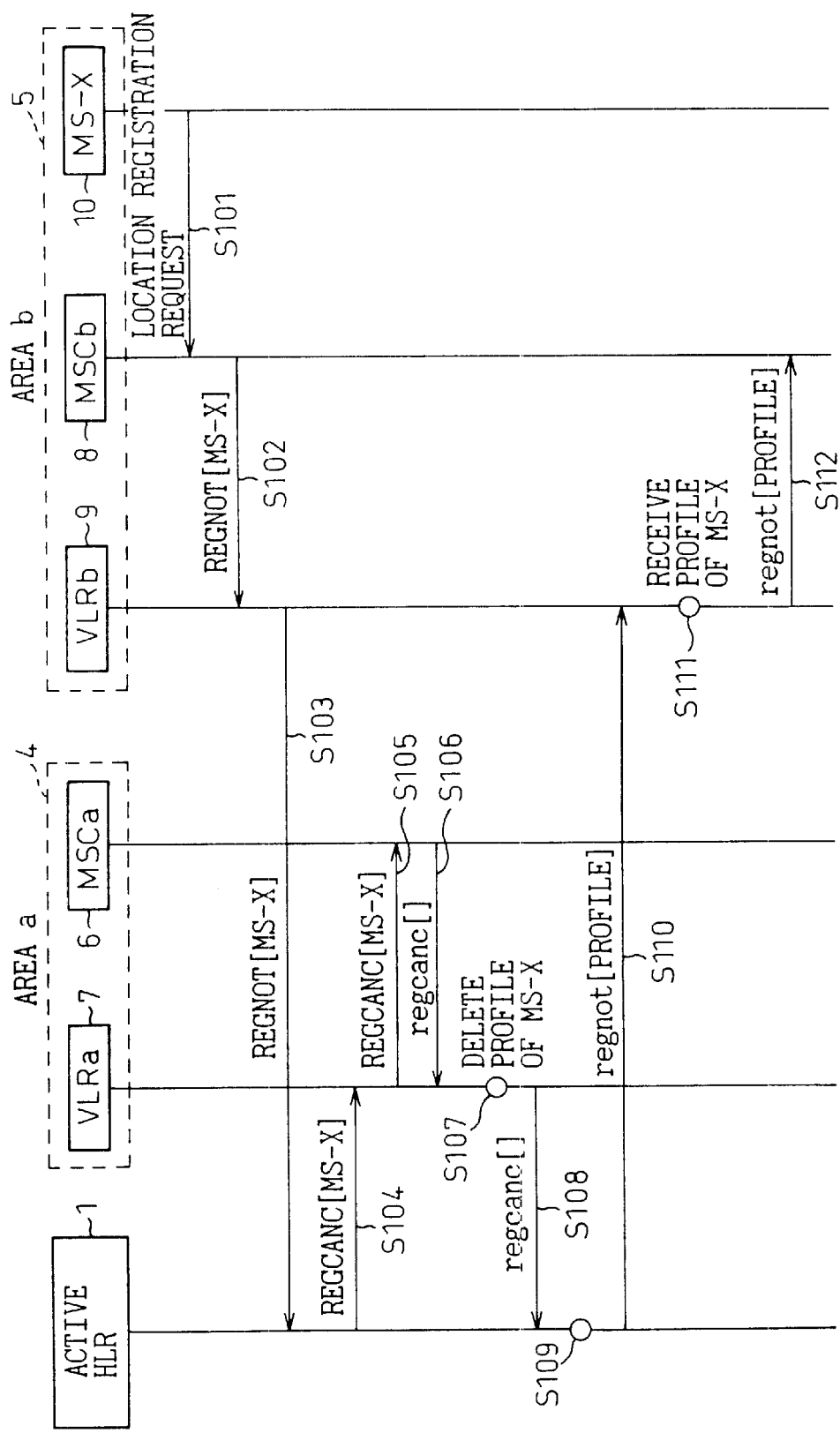
FIG. 3 is a diagram showing an example of a conventional location registration sequence.
Figure 22:
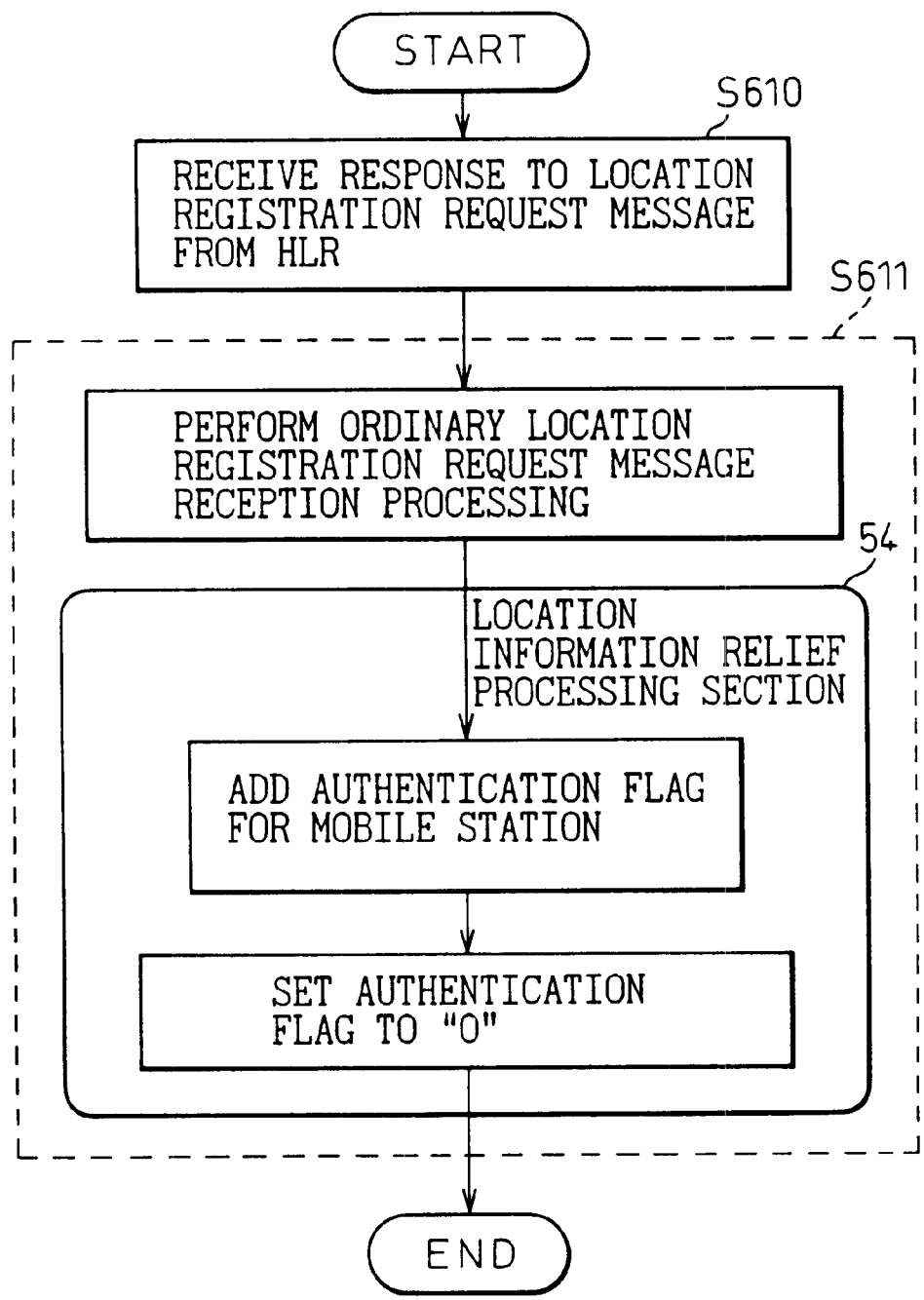
FIG. 22 is a flowchart showing an example of a location registration control flow in the visitor location register.

Previously, the example of the conventional location registration sequence has been described with reference to FIG. 3. The sequence of FIG. 21 is partly similar to this conventional sequence, and is different therefrom only in the processing to be performed in the visitor location register 9 (step S611). FIG. 22 illustrates the processing to be performed at the step S611. When the visitor location register 9 receives a response (regnot) to a location registration request message from the active home location register 1 (step S610), an operation of setting an authentication flag of the mobile station in the location information relief processing section 54 of the present invention is performed, in addition to the processing performed in the conventional system. In this case, the authentication flag is initialized to "0". This authentication flag (="0") is used to confirm that there are no calls originated from and incoming to the mobile station 10.

Incidentally, in the case that information or data necessary for performing authentication processing (incidentally, such data is referred to as SSD (Shared Secret Data) according to the IS-41-C) is present not only in the home location register but in the visitor location register (incidentally, such a case is referred to "SSD Shared" case according to the IS-41-C), it is not necessary for performing a second authentication to transmit an authentication request message to the home location register so as to verify and correct the location registration information in the home location register (this is because the verification and correction of the location registration information have been already completed at the first authentication). The same holds for an authentication at the time of incoming call. Thus, the system has the "authentication flag" so as to avoid the unnecessary verification and correction of the location registration information.

Figure 23:
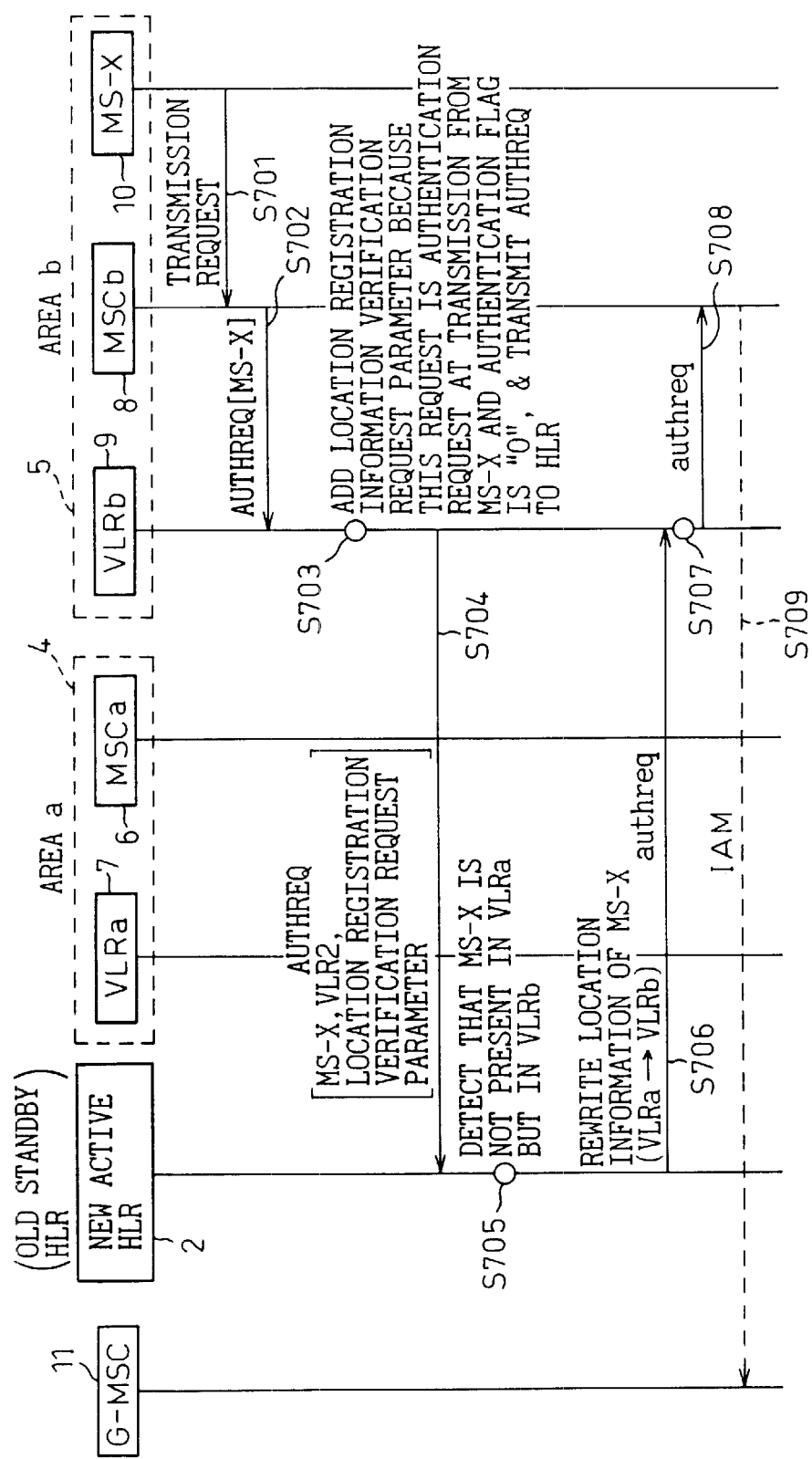
FIG. 23 is a diagram showing an example of a transmission or call originating sequence according to the present invention.

FIG. 23 illustrates an example of a transmission sequence.

In the case of this embodiment, the location registration request processing is finished when the mobile station 10 moves to the area 5 from the area 4. It is assumed that a fault occurs in the active home location register before the latest information on the mobile station 10 is registered in the standby home location register. In this case, the new active home location register 2 lacks in the location information of the mobile station 10.

As shown in FIG. 23, when the mobile switching center 8 receives a transmission request from the mobile station 10, the center 8 transmits an authentication request (AUTHREQ) message to the visitor location register 9 (steps 5701 and S702). When the visitor location register 9 receives the authentication request message to the mobile station 10, this location register 9 verifies (step S703) that this authentication is performed for the transmission and that the authentication flag is "0".

Figure 24:
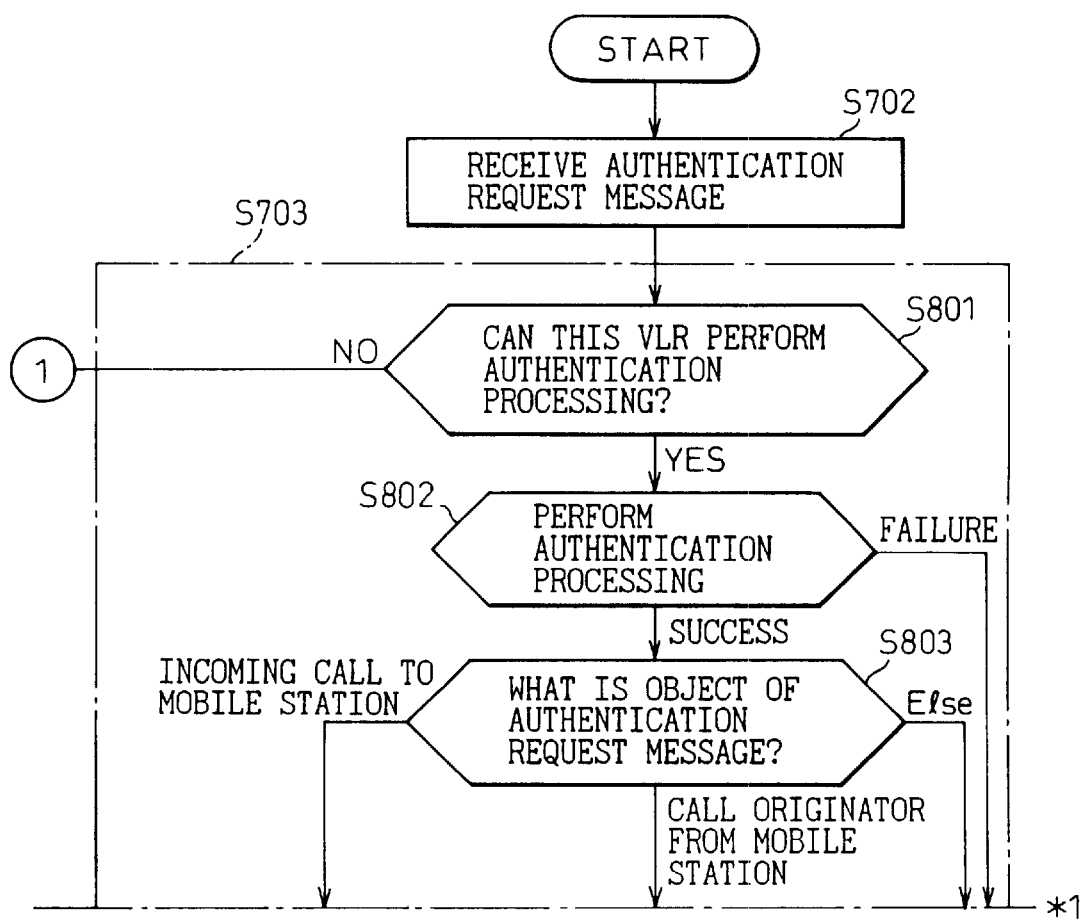
FIG. 24 is a flowchart showing an example (1) of an authentication request processing flow in the visitor location register.
Figure 25:
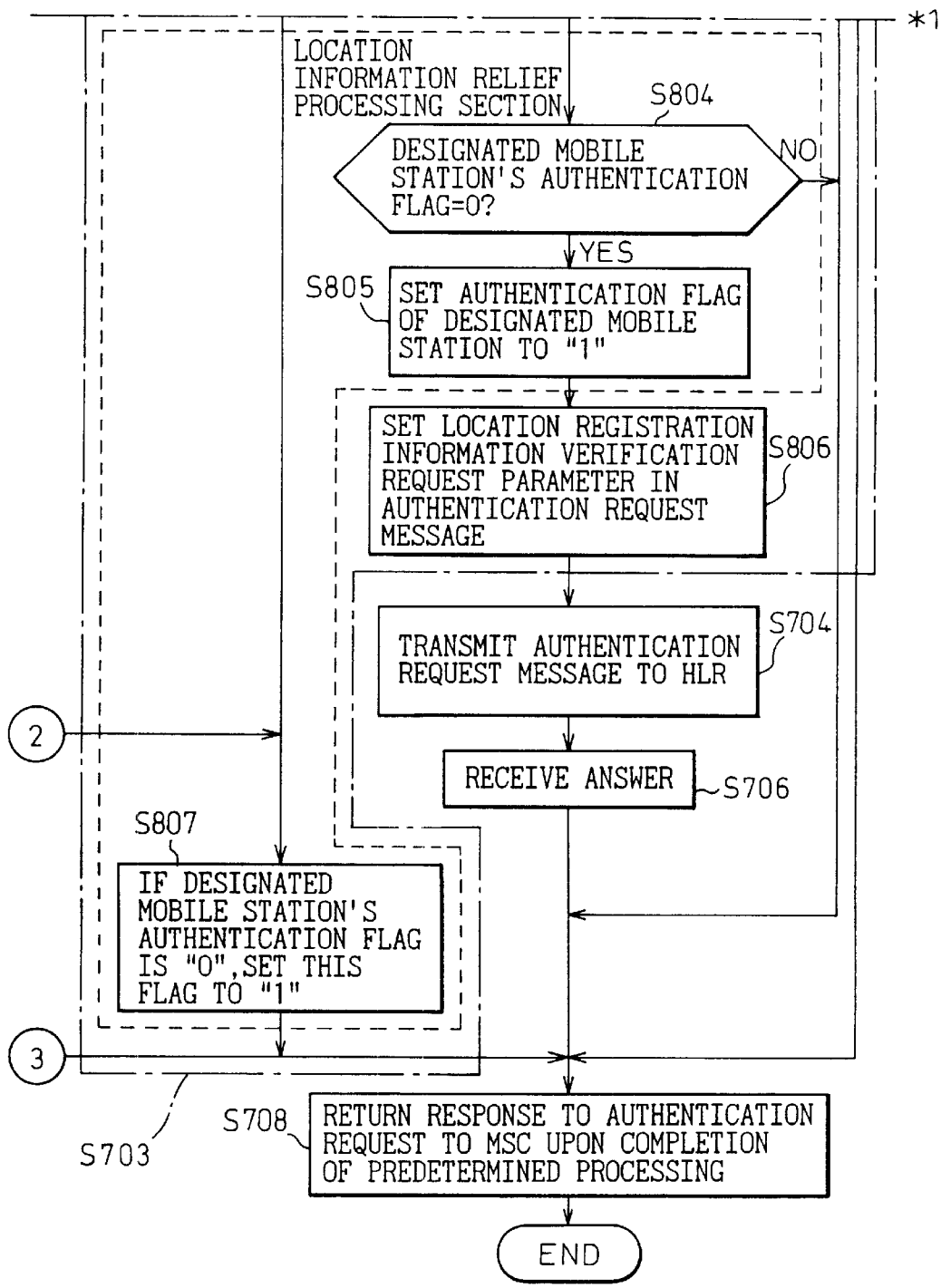
FIG. 25 is a flowchart showing an example (2) of the authentication request processing flow in the visitor location register.
Figure 26:
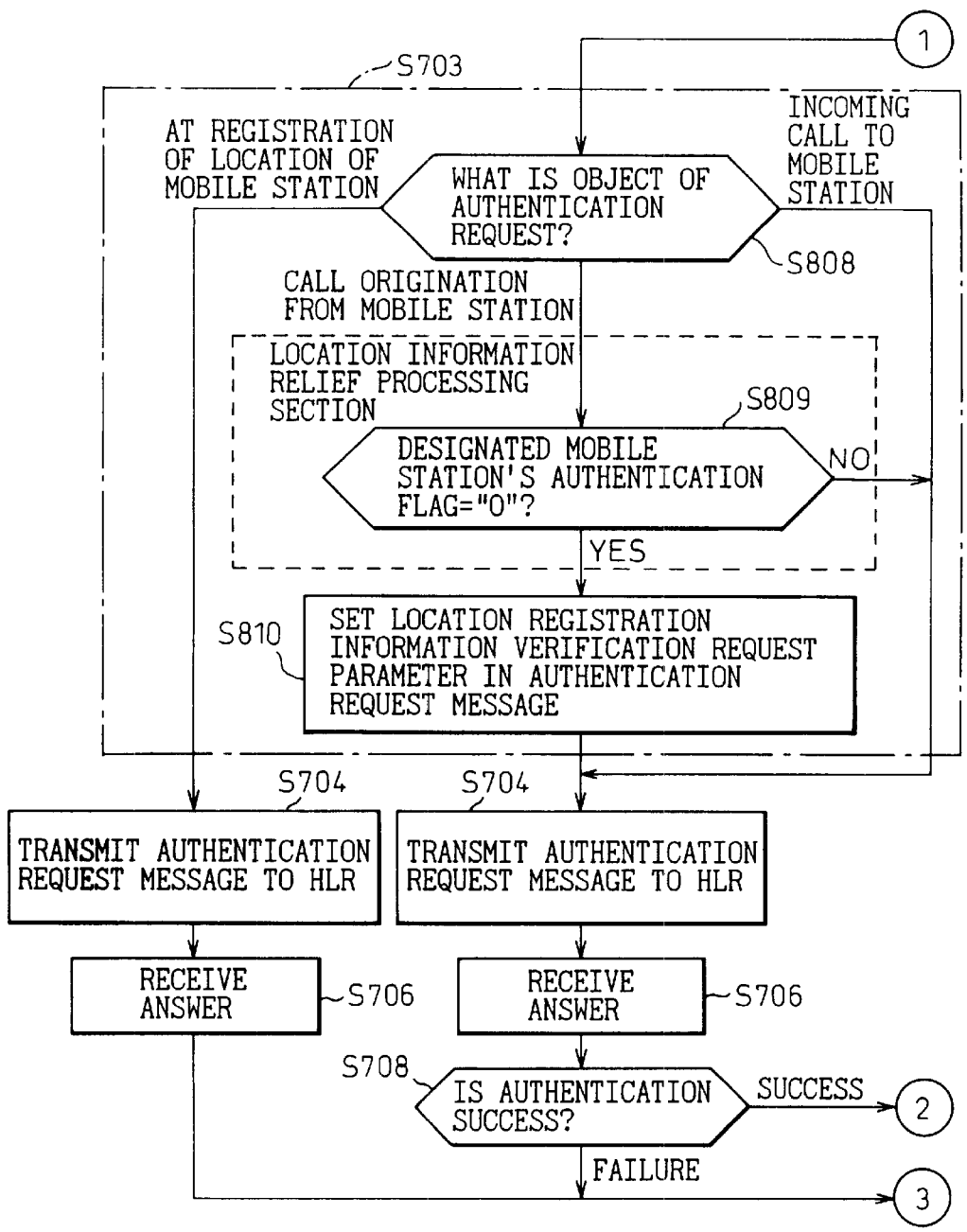
FIG. 26 is a flowchart showing an example (3) of the authentication request processing flow in the visitor location register.

FIGS. 24 to 26 illustrate an example of an authentication request process flow in the visitor location register. In this figure, an authentication process part of the visitor location register authentication flag is illustrated in a frame (step S703) that is indicated by one-dot chain lines. Moreover, in this frame, a process to be performed by the location information relief processing section 54 is described in a part enclosed by dotted lines (steps S804, S805, S807, and S809).

When the visitor location register 9 receives an authentication request message from the mobile switching center 8, the processing section 45 determines (steps S801 and S803) whether or not this section 45 has information needed for the authentication processing, and whether or not authentication is possible. If the visitor location register 9 can authenticate (step S801 and s803) and a call is originated from the mobile station (step S803), the location information relief processing section 54 judges on the value of the authentication flag (step S804). If the authentication flag="0", this case corresponds to the "first transmission after the location of the mobile station is registered", so that this flag is set to "1" (step S805). Then, the authentication processing section 45 transmits an authentication request message (AUTHREQ), to which a location registration information verification request parameter for the mobile station 10 is added, to the new active home location register 2 (steps S806 and S704).

Incidentally, in the case of the incoming call to the mobile station, such a flag is set to "1" without judgement on the value thereof (step S807). When the authentication at the incoming call to the mobile station 10 is successful, the authentication flag is set to "1", because the incoming call to the mobile station 10 is properly achieved. More particularly, the reason is that the authentication at the incoming call thereto is performed after the paging, and that the correctly achieved paging indicates that the correct location information of the mobile station 10 is registered.

Furthermore, even if it is judged that the own visitor location register 9 cannot perform the authentication processing of the mobile station, as illustrated in FIG. 26, an authentication request message, in which the location registration information request parameter is similarly set, is transmitted to the new active home location register 2 (steps S810 and S704) in the case that the call is originated from the mobile station and that the authentication flag is "0". In this case, when receiving an answer from the home location register 2 indicating that the authentication is successfully achieved, the authentication flag is set to "1" (steps S706 and S807).

Next, when the home location register 2 receives the authentication request message (AUTHREQ) from the visitor location register 9, and if the authentication processing is successfully achieved, the register 2 verifies whether or not a location registration information verification request parameter is included in this authentication request message. In this case, the difference between the location registration information (indicating VLRa in this case) of the mobile station 10 and the visitor location register 9 (VLRb), which is an originator of the authentication request message is checked. If there is a difference therebetween, the location registration of the mobile station 10 is corrected to the "pointer to VLRb" corresponding to the originator (step S705).

A message representing a result is returned to the originator, namely, the visitor location register 9 as a response message (authreq) to the authentication request. Then, the visitor location register 9 returns a corresponding response message to the mobile switching center 8 (steps S707 and S708). In the case of this embodiment, upon completion of this authentication processing, the mobile switching center 8 sends out an initial address message (IAM) to the gateway switching center.

Figure 27:
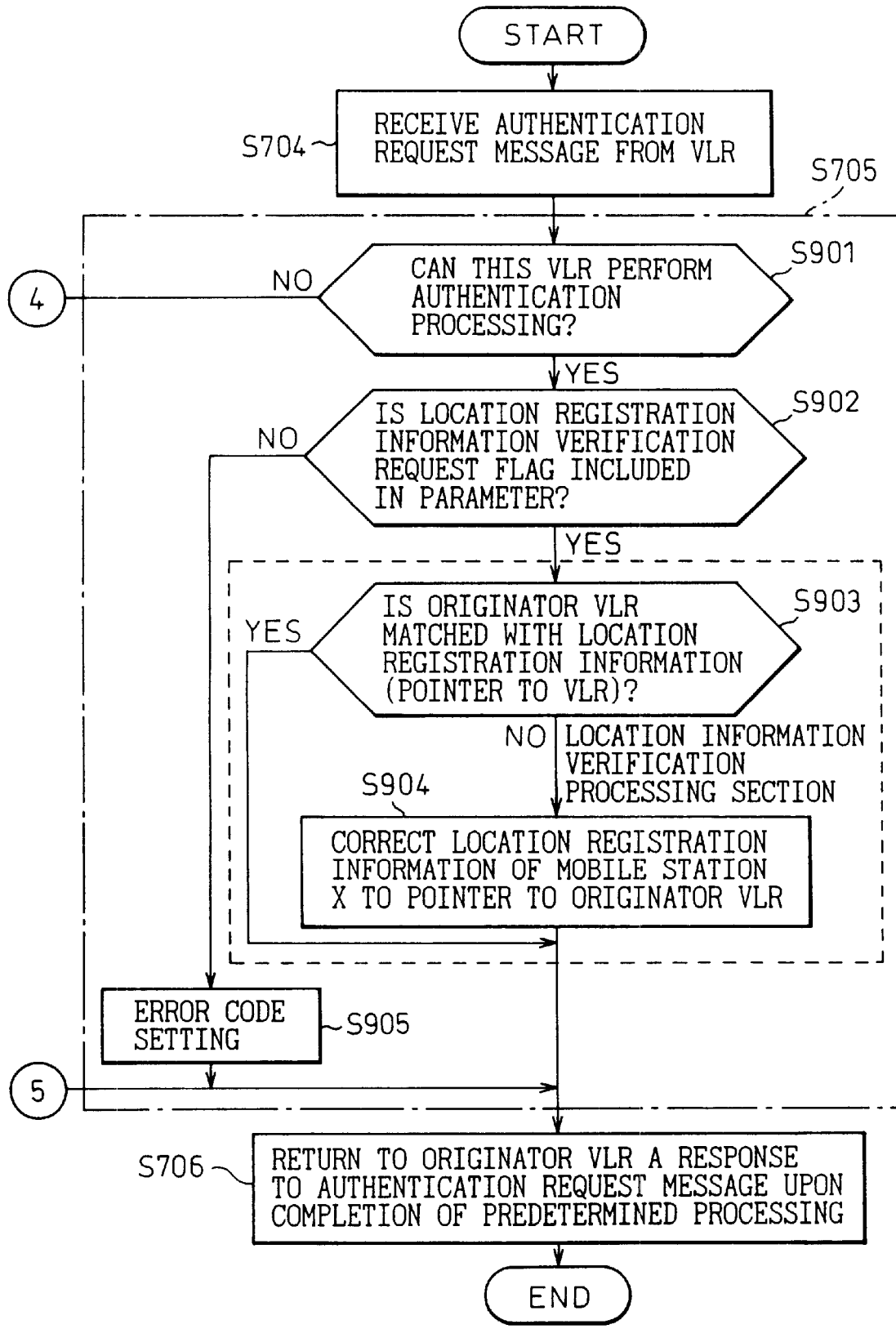
FIG. 27 is a flowchart showing an example (1) of an authentication request processing flow in the home location register.
Figure 28:
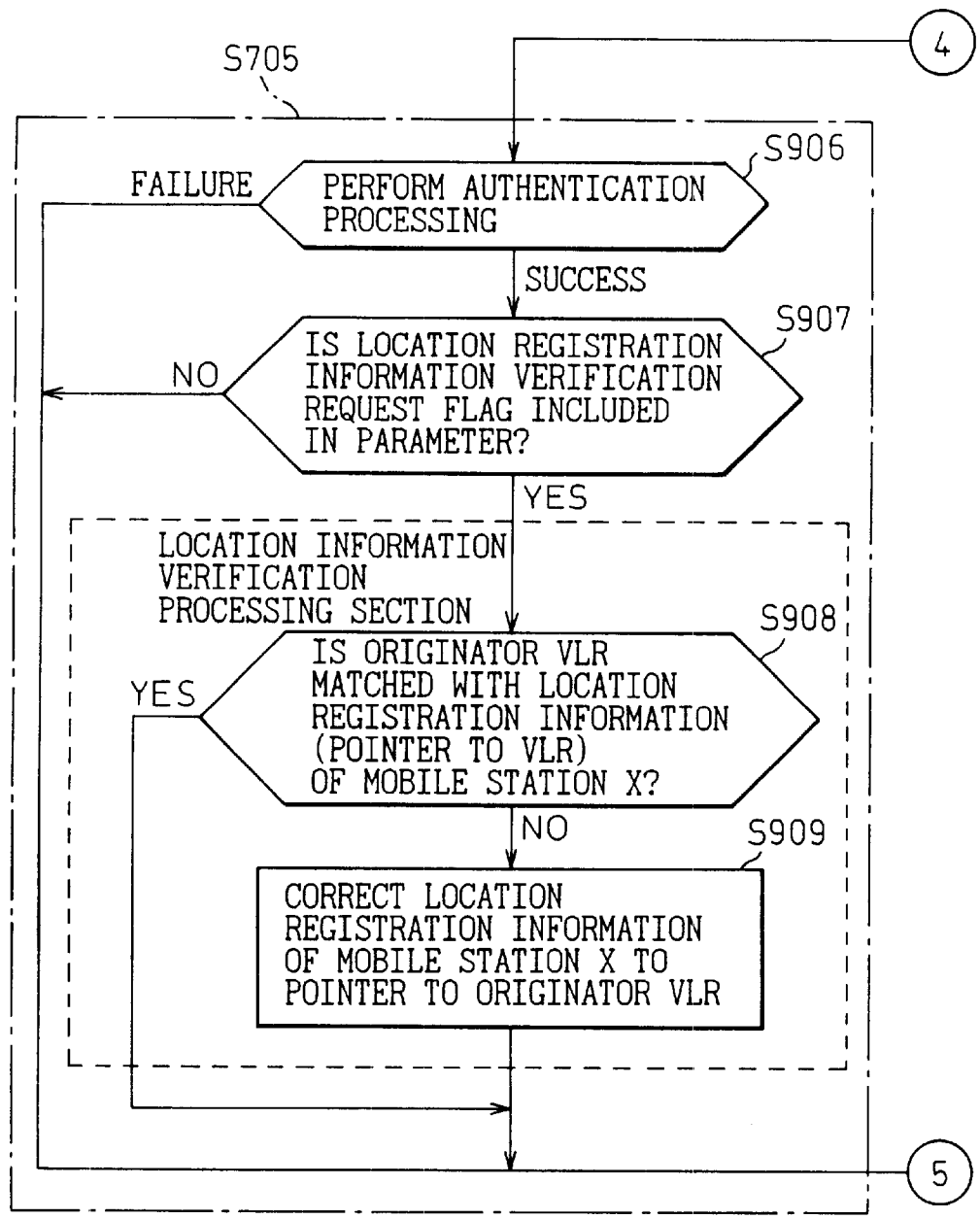
FIG. 28 is a flowchart showing an example (2) of the authentication request processing flow in the home location register.

FIGS. 27 and 28 illustrate examples of the control flow of the authentication request processing (step S705) performed at the side of the home location register 2. Further, in these figures, sections enclosed by dotted lines indicate the process to be performed by the location information verification processing section 34 (steps S903, S904, S908 and S909).

As shown in FIG. 27, when receiving the authentication request message from the visitor location register 9, the home location register judges (steps S704 and S901) whether or not the visitor location register 9 having transmitted this request message can perform the authentication processing (namely, this register 9 has information necessary for the authentication processing).

If it is judged that the register 9 can perform the authentication processing, the home location register further judges (at step S902) whether or not a location registration information verification request parameter is set in the received authentication request message. If it is confirmed that such a parameter is included in the request message, the home location register then judges (step S903) whether or not the visitor location register 9 (VLRb) having originated the authentication request message received in the location information verification processing section 34 through the location information management section 21 is matched with the location registration information (VLRa) registered in the home location register. If not matched, the location registration information is corrected to the location information (representing VLRb) of the originator (step S904). Thereafter, the predetermined processing is performed. Then, a response message to the authentication request is returned to the originator of this request (step,S706).

Incidentally, if the location registration information verification request parameter is not included in the authentication request message it is judged that the originating visitor location register has transmitted the authentication request message without a location registration information verification request, though this visitor location register has information necessary for the authentication processing and can perform the authentication processing, and then, a suitable error procedure is performed (steps S902 and S905).

FIG. 28 illustrates a process flow in the case that the visitor location register 9 is judged (step S901) to be unable to perform the processing of the authentication request message received therefrom (namely, the register 9 is judged to have no information necessary for performing the authentication processing). In this case, active home location register having such necessary information performs the authentication processing. The remaining processing is similar to the corresponding processing illustrated in FIG. 27. Incidentally, in the case of this embodiment, if the location registration information verification request parameter is not included in the authentication request message, the operation of the system is simply finished (step S907).

Meanwhile, the description of this embodiment does not disclose the relation between the setting of the authentication flag and the switching between the home location registers in particular. However, when the visitor location register detects the switching between the home location registers, all the authentication flags corresponding to all the mobile stations, which are present in the area corresponding to this visitor location register itself, may be set to "0". This enables the system to autonomously relieve the mobile station, whose location information is missing when the switching between the home location registers is performed.

Further, in the case of this embodiment, the verification and correction of the location registration information are inevitably performed when the authentication is carried out at the first transmission after the location registration is performed. However, usually, the system may set the initial values of the authentication flags to "1" and change all the authentication flags to "0" when the switching between the home location registers is performed. Thus, the verification and correction of the location registration information are performed only when the switching between the home location registers is performed. Consequently, the processing load on the home location register and the increase in traffic in the network, which relate to the location registration information verification, are suppressed.

Furthermore, in the case of this embodiment, the authentication flag is set when the location registration is performed. Then, the verification and correction of the location registration information are performed according to the set value of the authentication flag. Thus, it is understood that this embodiment essentially does not relate to the switching between the home location registers. Therefor, this embodiment can be employed as a general method of relieving the mobile stations, whose location information is missing, irrespective of the switching between the home location registers.

Incidentally, in the foregoing description, the IS-41-C is assumed to be the protocol for control signals in a mobile communication system. However, other protocols for such control signals may be employed as long as such protocols have the similar functions as of the IS-41-C. Additionally, in the aforementioned embodiment, each of the visitor location registers is adapted to manage only a single location registration area. However, each of the visitor location registers may be adapted to manage a plurality of location registration areas.

As described above, according to the present invention, even if an error occurs in information registered in a home location register owing to a fault, the system can acquire information on the latest location of a mobile station, without waiting for new registration of the location of the mobile station. Consequently, the present invention can prevent a mobile station, in the location registration information of which an error occurs, from disabling the incoming call to such a mobile station for a long time.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A mobile communication system comprising:
   an active home location register;
   a standby home location register;
   visitor location registers;
   mobile switching centers; and
   a mobile station,
   wherein the standby home location register switched from the active home location register according to a fault occurrence in the active home location register to operate as a new active home location register, includes a rerouting information acquisition section for performing routing information acquisition processing on another visitor location register, when receiving a response message, indicating that a corresponding mobile station is not present, in response to a routing information acquisition message sent out to one visitor location register.

2. The system according to claim 1, wherein said rerouting information acquisition section has:
   a visitor location register selection section for selecting another visitor location register to be used for rerouting; and
   a rerouting information acquisition process section for performing routing information acquisition processing on said selected visitor location register.

3. The system according to claim 1, wherein said rerouting information acquisition section further has a timer extension request processing section for making a request of a routing information acquisition request source to extend time required to perform rerouting information acquisition processing.

4. The system according to claim 1, wherein said rerouting information acquisition section comprises:
   a visitor location register selection section having information on placement of said visitor location registers and determining one of said visitor location registers, which serves as a destination of transmission of a rerouting information acquisition message; and
   a rerouting information acquisition processing section for performing transmission/reception processing of a rerouting information acquisition message with a visitor location register selected by said visitor location register selection section, and for correcting location registration information of a mobile station serving as a destination of transmission to a pointer to a visitor location register serving as an originator of a response message when receiving the response message, which indicates that said mobile station serving as the destination of transmission is registered in said visitor location register, as a response to the rerouting information acquisition message.

5. A mobile communication system comprising:
   a home location register;
   a visitor location register;
   a mobile switching center; and
   a mobile station,
   wherein the visitor location register has a rerouting information acquisition section for performing routing information acquisition processing on another visitor location register independently from the home location register, and then informing the home location register of a result of the routing information acquisition processing, when the visitor location register having received routing information acquisition message from the home location register has no profile of a corresponding mobile station therein.

6. The system according to claim 5, wherein said rerouting information acquisition section has:
   a visitor location register selection section for selecting another visitor location register to be used for rerouting; and
   a rerouting information acquisition processing section for performing routing information acquisition processing on said selected visitor location register.

7. A mobile communication system comprising:
   home location registers;
   visitor location registers;
   mobile switching centers; and
   mobile stations,
   wherein each of said home location registers, include
      a rerouting information acquisition section for performing routing information acquisition processing when receiving in response to a routing information acquisition message which is sent out to one of said visitor location registers, a response message indicating that a corresponding one of said mobile stations is not present, and
   wherein said rerouting information acquisition section has:
      a visitor location register selection section for selecting another visitor location register to be used for rerouting; and
      a rerouting information acquisition processing section for performing routing information acquisition processing on said selected visitor location register,
   wherein said rerouting information acquisition section further has a timer extension request processing section for making a request of said one of home location registers to extend time required to perform rerouting information acquisition processing, and wherein said one of home location registers has a timer extension request processing section for performing processing in response to a time extension request sent from said timer extension request processing section.

8. A mobile communication system comprising:
   home location registers;
   visitor location registers;
   mobile switching centers; and
   mobile stations,
   wherein each of said home location registers, include
      a rerouting information acquisition section for performing routing information acquisition processing when receiving in response to a routing information acquisition message which is sent out to one of said visitor location registers, a response message indicating that a corresponding one of said mobile stations is not present, and
   wherein said rerouting information acquisition section has:
      a visitor location register selection section for selecting another visitor location register to be used for rerouting; and
      a rerouting information acquisition processing section for performing routing information acquisition processing on said selected visitor location register,
   wherein said visitor location register selection section preferentially selects a visitor location register that is present in the vicinity of a visitor location register serving as an origin.

9. The system according to claim 8, wherein said visitor location register selection section preferentially selects said visitor location register having higher probability of movement according to mobile-station movement historical data in each of said visitor location registers, which are present in the vicinity of said visitor location register as the origin.

10. A mobile communication system comprising:
    home location registers;
    visitor location registers;
    mobile switching centers; and
    mobile stations,
    wherein each of said home location registers, include
       a rerouting information acquisition section for performing routing information acquisition processing when receiving in response to a routing information acquisition message which is sent out to one of said visitor location registers, a response message indicating that a corresponding one of said mobile stations is not present, and
    wherein said rerouting information acquisition section has:
       a visitor location register selection section for selecting another visitor location register to be used for rerouting; and
       a rerouting information acquisition processing section for performing routing information acquisition processing on said selected visitor location register,
    wherein said rerouting information acquisition processing section sequentially transmits routing information acquisition messages to a plurality of visitor location registers selected by said visitor location register selection section.

11. A mobile communication system comprising:
home location registers;
visitor location registers;
mobile switching centers; and
mobile stations,
wherein each of said home location registers, include
a rerouting information acquisition section for performing routing information acquisition processing when receiving in response to a routing information acquisition message which is sent out to one of said visitor location registers, a response message indicating that a corresponding one of said mobile stations is not present, and
wherein said rerouting information acquisition section has:
a visitor location register selection section for selecting another visitor location register to be used for rerouting; and
a rerouting information acquisition processing section for performing routing information acquisition processing on said selected visitor location register,
wherein said rerouting information acquisition processing section multicasts a routing information acquisition message to a plurality of visitor location registers selected by said visitor location register selection section.

12. A mobile communication system comprising:
a home location register;
a visitor location register;
a mobile switching center; and
a mobile station,
wherein the visitor location register has a location information relief processing section for sending the home location register a request to verify location registration information without waiting for reception of a location registration request from the mobile terminal, and
wherein the home location register has a location information verification processing section for verifying and correcting the location registration information with location registration information held therein in response to the request from the location information relief processing section, and for correcting the location registration information according to a result of verifying and correcting thereof.

13. The system according to claim 12, wherein said location information verification processing section receives a message requesting verification of location registration information sent from said location information relief processing section and collating the location registration information with inner location registration information, which represents a VLR pointer, and for correcting the location registration information indicated by the message to a value of the VLR pointer when the location registration information indicated by the message does not indicate said visitor location register which transmitted the message.

14. The system according to claim 12, wherein said location information relief processing section requests verification of the location registration information when detecting switching between said home location registers.

15. A mobile communication system comprising:
home location registers;
visitor location registers;
mobile switching centers; and
mobile stations,
wherein each of said visitor location registers has a location information relief processing section for sending one of said home location registers a request to verify location registration information, and wherein one of said home location registers has a location information verification processing section for verifying and correcting the location register information with location registration information held therein in response to the request from said location information relief processing section and for correcting the location registration information according to a result of verifying and correcting thereof,
wherein said location information verification processing section receives a message requesting verification of location registration information sent from said location information relief processing section and correcting the location registration information with inner location registration information, which represents a VLR pointer, and for correcting the location registration information indicated by the message to a value of the VLR pointer when the location registration information indicated by the message does not indicate said visitor location register which transmitted the message, and
wherein, if it is judged that verification of location registration information managed by said home location register is necessary when authentication of a mobile station is performed, said location information relief processing section adds a parameter, which indicates that verification of location registration information is requested, to an authentication request message and transmits the authentication request message to said home location register, and wherein said location information verification processing section performs collation, verification and correction of the location registration information when a parameter, which indicates that the verification of the location registration information is requested, is added to an authentication request message received from said visitor location register.

16. The system according to claim 15, wherein, if an authentication request is a first one performed after location of said mobile station is registered in an own visitor location register provided in an area, in which said mobile station is present, and the authentication request is performed at transmission from said mobile station when judging necessity for verifying the location registration information, said location information relief processing section adds a parameter, which indicates that verification of the location registration information is requested, to the authentication request message and then transmits the authentication request message to said home location register.

17. The system according to claim 16, wherein said location information relief processing section manages an authentication flag corresponding to each of said mobile stations, which is present in the area corresponding to said own visitor location register, for verification of and judgement on the location registration information, and wherein said location information relief processing section sets the authentication flag to "0" when said mobile station moves to the area corresponding to said own visitor location register, and sets the authentication flag to "1" when a originating call from, or a call incoming to, said mobile station is performed, to thereby judge whether or not the authentication request is a first authentication request issued after location of said mobile station is registered in said own visitor location register.

18. The system according to claim 17, wherein, at an occurrence of an operation of switching between said home location registers, said location information relief processing section sets the authentication flags corresponding to all of said mobile stations, which are present in the area corresponding to said own visitor location register, to "0".

19. The system according to claim 15, wherein said location information relief processing section manages information representing an authentication flag corresponding to each of said mobile stations, which are present in an area corresponding to said own visitor location register, and sets the authentication flag to "0" when said mobile station moves to the area corresponding to said visitor location register, wherein, when receiving the authentication request message, said location information relief processing section performs authentication if said visitor location register can perform authentication, wherein, if the authentication is successfully achieved, an authentication request message, to which a parameter requesting verification of location registration information is added, is transmitted to said home location register, wherein said location information relief processing section sets the authentication flag corresponding to said mobile station to "1" after completion of verification of the location registration information is confirmed by a response to the authentication request message, and wherein, when said visitor location register cannot perform the authentication, said location information relief processing section transmits the authentication request message, to which the parameter requesting the verification of the location registration information is added, to said home location register and sets the flag corresponding to said mobile station to "1" when it is judged from a response to the authentication request message that the authentication processing is successfully achieved.

20. A mobile communication system including home location register comprises a rerouting information acquisition section for performing routing information acquisition processing on another visitor location register, when receiving a response message, indicating that a corresponding mobile station is not present, in response to a routing information acquisition message, sent out to another visitor location register.

* * * * *